United States Patent [19]

Theuer

[11] Patent Number: 5,837,309
[45] Date of Patent: Nov. 17, 1998

[54] PROCESS OF MAKING A BABY FOOD CONTAINING LIGHT FLESHED VEGETABLES AND PRODUCT THEREOF

[75] Inventor: Richard C. Theuer, Chesterfield, Mo.

[73] Assignee: Beech-Nut Nutrition Corporation, St. Louis, Mo.

[21] Appl. No.: 873,940

[22] Filed: Jun. 12, 1997

Related U.S. Application Data

[63] Continuation-in-part of Ser. No. 741,703, Oct. 31, 1996, which is a continuation-in-part of Ser. No. 604,616, Feb. 21, 1996, Pat. No. 5,723,166.

[51] Int. Cl.$^6$ .................................................. A23L 1/212
[52] U.S. Cl. ........................ 426/615; 426/518; 426/523; 426/801
[58] Field of Search .................................. 426/801, 615, 426/518, 523

[56] References Cited

U.S. PATENT DOCUMENTS

| | | | |
|---|---|---|---|
| 4,911,943 | 3/1990 | Slimak | 426/629 |
| 4,923,709 | 5/1990 | Slimak | 426/640 |
| 4,925,696 | 5/1990 | Slimak | 426/637 |
| 4,925,697 | 5/1990 | Slimak | 426/637 |
| 4,929,467 | 5/1990 | Slimak | 426/637 |
| 4,929,469 | 5/1990 | Kimura et al. | 427/54.1 |
| 4,946,703 | 8/1990 | Slimak | 426/637 |
| 5,204,137 | 4/1993 | Slimak | 426/637 |
| 5,244,689 | 9/1993 | Slimak | 426/629 |
| 5,248,515 | 9/1993 | Payton et al. | 426/599 |

OTHER PUBLICATIONS

Accashian, Carmen, "How Safe Are Some Baby Foods" from Denver Post, Sep. 8, 1985 cutout.

Ameny et al "Protein Quality Of Weaning Baby Food From African White Fleshed Sweetpotato Varieties And Apios Americana With Pigeon Peas Added As A Complementary Protein" from Nutrition Research, vol. 14, No. 9, pp. 1397–1406, 1994.

Congdon, P.J. et al, "Benign Carotenemia in Children" from Archives of Disease in Childhood, 1981, pp. 292–294.

Food & Nutrition Board, Commission on Life Sciences National Research Council, Selection from Chapter 7, "Fat–Soluble Vitamins" from Recommended Dietary Allowances, 10th Edition, 1989, pp. 78–81.

Hunter Associates Laboratory, Inc., Workshop course notes from Hunterlab Colorlab, 1992–93.

Lascari, Andre D., M.D., "Carotenemia, A Review" from Clinical Pediatrics, 1981, pp. 25–29.

Lopez, Anthony/Editor, Chapter 11 from "A Complete Course in Canning", 12th Edition, 1987, pp. 437–447.

Lui, Nan Sen Tseng & Roels, Oswald A., Selections from Chapter 6, "The Vitamins" from Modern Nutrition in Health & Disease, 6th Edition, 1980, pp. 148–149, 154–159.

Olson, James A., Selections from Chapter 11, "Vitamin A" from Present Knowledge in Nutrition, 6th Edition, 1990, pp. 96–97.

O'Neil, R.R., M.D. Lowe, C.U., M.D., "Benign Carotene of Infancy" from Pediatrics, 1962, pp. 692–693.

Rubatzky, Vince, et al, Announcement concerning 1994 Hybrid Carrot Trial, Jan. 26, 1994, letter and 4 page attachment.

Stirling, H.F., et al, "Hypercarotenaemia & Vitamin A Over-dosage" from Proprietary Baby food, The Lancet, May 10, 1986, p. 1089.

Theuer, Richard C., Ph.D., "Feeding Baby Right, How Food Can Turn Your Baby Yellow", late 1980s, one page.

Treneman, Ann, "Baby Foods May Cause Carotenemia" from the Evening Press, 10/109/83, Section B.

Unknown, "Vitamins in Baby Food" from New York Times, May 4, 1983, cutout.

C.F.R. §113, "Thermally Processed Low Acid Foods Packaged in Hermetically Sealed Containers", Apr. 1, 1994, pp. 227–253.

Burros, Marian, "Eating Well" from the New York Times, Feb. 21, 1996, Section B.

*Primary Examiner*—Helen Pratt
*Attorney, Agent, or Firm*—Howell & Haferkamp, L.C.

[57] ABSTRACT

Product and process of making a baby food containing water, a food suitable for consumption by babies and a light fleshed vegetable which is a non-bleeding beet root. The method requires mixing water with a pureed food and the pureed non-bleeding beet root, cooking the mixture, and comminuting and straining the cooked food to produce a reduced beta-carotene level food.

26 Claims, No Drawings

PROCESS OF MAKING A BABY FOOD CONTAINING LIGHT FLESHED VEGETABLES AND PRODUCT THEREOF

CROSS-REFERENCES TO RELATED APPLICATION

This application is a continuation-in-part of U.S. patent application Ser. No. 08/741,703, filed on Oct. 31, 1996, which in turn is a continuation-in-part of U.S. patent application Ser. No. 08/604,616 filed on Feb. 21, 1996 now U.S. Pat. No. 5,723,166.

BACKGROUND OF THE INVENTION

The present invention relates to baby foods and more particularly to baby foods in which whole foods are used as fillers.

Vitamin A designates a group of compounds essential for vision, growth, cellular differentiation and proliferation, reproduction and the integrity of the immune system. Humans can absorb vitamin A directly or they can convert certain carotenoids with provitamin A activity into vitamin A. The Recommended Dietary Allowances ("RDA"), revised in 1974, of vitamin A are: for infants and children up to 10 years, from 1,400 to 3,300 IU; for adult females, 4,000 IU; for adult males, 5,000 IU; for pregnant women, 5,000 IU; for lactating women, 6,000 IU. For infant food labeling purposes, a figure of 1500 IU of vitamin A is the Recommended Daily Intake ("RDI") upon which current food vitamin A declarations are based.

Carotenoids are pigments that are widely distributed in plant tissues. These pigments, which are also referred to as retinoids, are characterized by their red, yellow and orange colors. Carotenoids vary qualitatively and quantitatively in vitamin A activity. Only 50 of approximately 600 carotenoids found in nature have provitamin A activity and therefore can be converted in the body to vitamin A.

The occurrence of a pigmented carotenoid in food should not necessarily be taken as an indication of its value as a source of provitamin A that the body converts into vitamin A. For example, some yellow pigments, xanthophylls, that occur in squash, and some red pigments, lycopenes, that occur in tomatoes have no vitamin A activity whatsoever.

Vitamin A is a fat-soluble vitamin that is stored primarily in the liver. In the human diet, vitamin A is derived primarily from two sources: 1) provitamin A from fruits and vegetables and 2) preformed vitamin A from animal sources. The richest sources of preformed vitamin A are liver and fish liver oils. Appreciable quantities are also present in whole and fortified milk and eggs. Because only a few carotenoids serve as pro-vitamin A compounds and because many other yellow and orange carotenoid and other pigments are present in plants, the color intensity of a fruit or vegetable is not a reliable indicator of its content of provitamin A.

Vitamin A is highly toxic when given in excess. This condition is sometimes referred to as acute hypervitaminosis A. Massive doses of beta-carotene are not converted to vitamin A efficiently enough to induce vitamin A toxicity, but excess carotene accumulates in the body and may cause carotenemia, discussed above. Cooking and pureeing of vegetables ruptures cell membranes and thereby makes beta-carotene more available for human absorption. Because of this absorption phenomenon, babies that are fed strained baby foods with a high carrot content are particularly susceptible to carotenemia. Orange carrots are probably the most common cause of dietary carotenemia, especially in babies.

Government labeling requirements mandate that the amounts of vitamin A, as well as vitamin C and calcium and iron be printed on the label of baby foods, expressed as a "Percent of Daily Value" per serving. The term "Percent of Daily Value" is typically printed on the label as "% Daily Value." For baby foods, the percentage of Daily Value of vitamin A means the percentage of the "Reference Daily Intake" of 1500 IU in each jar. For example, if the label on a jar of baby food under the column % Daily Value stated 100%, it would contain no less than 1500 IU of vitamin A; if it stated 50%, it would contain no less than 750 IU of vitamin A. Food producers must therefore carefully categorize and measure the carotenoid pigments in food products. Chromatographic separation of different carotenoid pigments is believed to be the most accurate method currently available to identify those carotenoids that have vitamin A activity. The officially recognized method for measuring vitamin A is the procedure published by the Association of Official Analytical Chemists (AOAC), which is known to those skilled in the art.

High-pressure liquid chromatography ("HPLC") may be used to separate beta-carotene from alpha-carotene and other carotenoids. Beta-carotene is the most active carotenoid and makes the most important quantitative contribution to human nutrition concerning vitamin A. Beta-carotene is the predominant carotenoid pigment in orange carrots. The predominant carotenoid pigment in yellow and white carrots is believed to be xanthophyll.

In the early 1980s, different baby food manufacturers used different methods to calculate the amount of vitamin A in their products. Today the FDA enforces a generally common conversion ratio range from the National Academy of Sciences that ensures generally uniform labeling.

Commercially prepared baby foods are often categorized into different groups, such as juices, fruits, vegetables and dinners. Dinners are foods that normally include one protein rich food as a characterizing ingredient with names that describe some, but not the totality of the contents, e.g., macaroni and beef; vegetable-chicken and turkey-rice. Similarly, vegetables are foods that include one or more vegetables with names that are generally descriptive, e.g., mixed vegetables.

From a historical perspective, these dinners and vegetables often contained a) orange carrots and b) fillers such as starches and flours. For example, Beech-Nut Nutrition Corporation (Beech-Nut), the assignee of the present patent application, once produced a macaroni and beef dinner that included approximately 17% orange carrots and approximately 4% rice starch and rice flour by weight, and a turkey-rice dinner that included approximately 17% orange carrots and approximately 7% rice starch and rice flour by weight. Mixed vegetables included approximately 25% orange carrots and approximately 5% rice starch and rice flour by weight.

In the early 1990s, Beech-Nut decided to change its formulations and introduced a "whole food concept" that drastically reduced or eliminated the starch and flour fillers. By "whole food" what is meant is the entirety of a food such as a vegetable or tuber thereof or of the entirety of a portion of the food (such as a peeled sweet potato), but without further treatment to selectively separate certain types of ingredients of the food or part thereof from the others. Therefore, the "whole" food is used. Of course, the whole food may be comminuted and treated (such as by cooking, curing or both) prior to or subsequent to the comminution, and one portion of the food (e.g., the peel) may be separated from the portion thereof to be used without departing from the scope of the phrase "whole food."

One way to implement the whole food concept was to increase the amount of orange carrots in the baby food formula. Orange carrots are widely cultivated, economical to produce and are available year round to baby food producers in a fresh or frozen form. Unfortunately, an increase in the orange carrot content of the baby food resulted in two undesirable results.

First, the increased orange carrot content increased the chances that a baby would develop carotenemia, which will be discussed in greater depth below. Second, the increased carrot content tended to give all of the different dinners a generally orange color. Mothers prefer to feed their babies a diverse diet, composed of a wide variety of foods, perceiving it to be more healthy. Mothers judge variety, at least in part, on the colors of the baby foods. It is therefore advantageous from a marketing perspective to differentiate the dinners by name and overall appearance, without the use of fillers.

In addition to the color differentiation problem, carotenemia can occur in some babies fed baby foods that contain orange carrots or other foods rich in carotenoids. Carotenemia is a condition of yellowish discoloration of the skin resulting from ingestion of large amounts of food containing carotenoids. Carotenemia is most likely to be confused with jaundice but can be distinguished clinically by the absence of yellow pigmentation of the sclera and mucous membranes. The importance of carotenemia is that it should be properly identified and not confused with jaundice. Although carotenemia is a benign condition, it may arouse considerable anxiety in parents and can lead to unnecessary medical evaluation.

All carrots are described botanically as Daucus carota; however, Americans are most familiar with orange carrot cultivars. Historically, these orange carrots had a beta-carotene content of 50–100 ppm (8,350 International Units ["IU"]—16,700 IU per 100 grams). For purposes of comparison, the average cantaloupe has a beta-carotene content of approximately 15–20 ppm. However, Americans have become fascinated with the perceived benefits of beta-carotene, and carrot breeders have developed new cultivars that have even a higher beta-carotene content—in the range of 75–150 ppm (12,525 IU —25,050 IU per 100 grams). It is believed that the beta-carotene content of orange carrots commercially available in the U.S. may increase in the future due to the development of new cultivars that contain even more beta-carotene. Largely unknown in America are other carrot cultivars that can be called "white carrots," that have a beta-carotene content of less than 10 ppm (1667 IU per 100 grams). Another type of carrot also exists that is generally called a "yellow carrot," that also has a beta-carotene content of less than 10 ppm. In cold storage, some white carrots can become yellow and vice versa.

One way to address these undesirable results is to decrease the amount of orange carrots and increase the amount of peas or other green vegetables, e.g., broccoli and green beans, in the formula. Unfortunately peas, broccoli and green beans are more expensive than orange carrots on an equivalent consistency basis, and so are less viable economic alternatives. Until the advantages of certain light-fleshed vegetables in connection with present invention were discovered, the aforementioned undesirable results were implicit in commercial dinners that were produced using the whole food concept.

Moreover, even setting aside the economic considerations, only certain limited types of vegetable are suitable candidates for use as a filler. To be a candidate for use as a whole food fillers, a vegetable must fulfill several criteria. It is preferable, although not essential, that the vegetable have a history of being consumed in the human diet. Such prior use provides a basis for the safe addition to the diet thereby increasing the likelihood of acceptance of the vegetable in a baby food composition.

It is also implicit in the concept of a filler that the whole food filler not noticeably affect the characteristics of the other ingredients in the food. Thus, it is highly desirable that the vegetable not interfere significantly with the color, taste or texture of the baby food imparted by other ingredients.

The vegetable also must be organoleptically suitable or incorporation into a baby food composition. Infants are known to display an aversion to bitter tastes at a very early age (Trahms, in *Nutrition in Infancy and Childhood*, Pipes and Trahms, Eds, Mosby, St. Louis, 1993, pp. 181–194; Kajiura et al, *Developmental Psychobiol* 25:375–386; Rosenstein et al., *Child Develop* 59:1555–1568, 1988 which are incorporated by reference). Furthermore, it has been shown that children respond to bitter tastes in much the same way as adults (Lawless, *Am Diet Ass'n* 85:577–585, 1985 which is incorporated by reference). Thus, a food product having a strong bitter taste would not be acceptable in a baby food composition. Assessment of the bitterness level to determine which fructan-containing vegetables are suitable for use in a baby food can be performed by the skilled artisan using routine experimentation such as that disclosed in Example 7 below. Because the adult perception of bitter tastes closely follows that in the infant, it is possible to conduct such testing in adults (Id.). Furthermore, food preferences or aversions of the adult caring for the infant are known to influence which foods are offered to the infant (Trahms, supra; Brooks, *The Wall St J*, Dec 4, 1996 pp A1,A6 which are incorporated by reference). Standard testing procedures for sensory evaluation are known in the art (see, for example, Stone and Sidel in *Sensory Evaluation Practices*, Academic Press, Orlando, 1985, pp 58–86, 227–252 which is incorporated by reference).

Infants also tend to reject or at least show a diminished acceptance of strong flavors and, in particular strong-flavored vegetables (Lowenberg, in *Nutrition in Infancy and Childhood*, Pipes and Trahms, Edds, Mosby, St. Louis, 1993, pp. 165–180; Brooks, supra; Lawless, supra; Ashbrook et al, *J Nutrition Ed* 17:5, 6, 46, 1985; Beal Pediatrics 20:448–456, 1957 which are incorporated by reference). Therefore, vegetables suitable for use in a baby food composition, preferably, do not have a strong flavor. The testing of vegetables for the presence of strong flavors can also be readily performed by the skilled artisan using routine methods (Stone and Sidel, supra which is incorporated by reference).

Testing for organoleptic acceptability could, for example, be performed in infants after obtaining informed consent from parents in a double-blind, randomized controlled study. Infants of ages from about 4 months to about 12 months would be fed a series of baby food composition prepared with a particular vegetable or a baby food composition that includes a standard vegetable normally used in baby food preparations and known to be accepted by the infants such as, for example, carrots. The adult feeding the infant would then record acceptability and tolerance including amount offered, amount consumed and amount refused by the babies as well as the number, color and consistency of stools. Acceptability rating would be performed by methodology known in the art (for example, Stone and Sidel, *Sensory Evaluation Practices*, Academic Press, Inc., Orlando, 1985, pp. 58–86 which is incorporated by reference). The results would be analyzed and vegetable compositions showing acceptance comparable to or greater than that of the standard vegetable would be considered suitable for use as an infant food.

In the invention of U.S. patent application Ser. No. 08/604,616, now U.S. Pat. No. 5,723,166 it was found that white and/or yellow carrots can be used in lieu of, or in combination with, orange carrots in baby food to reduce the level of beta-carotene and thus the risk of carotenemia and simultaneously to permit color variety in the appearance of the product. White carrot cultivars are little known in the United States. Some white carrot cultivars are grown abroad, primarily as a forage crop for livestock. Applicants are not aware of any other U.S. patent art that refers to white carrots.

In the invention of the noted co-pending U.S. patent application, it also was found that white sweet potatoes can be used in lieu of, or in combination with, white carrots and orange carrots to achieve the aforementioned results. The term "white sweet potatoes" refers to tubers of light colored flesh of the species Ipomoea batata, of the morning glory family, Convolvulaceae, having a beta-carotene content of less than 20 ppm.

White sweet potatoes are known in the patent art. For example, see U.S. Pat. Nos.: No. 4,925,697 entitled "Process for Products from Sweet Potato"; No. 5,204,133 entitled "Process for Products from Sweet Potato and No. 5,244,689 entitled "Flour, Bread, Milk and Other Products from White Sweet Potatoes, Cassava, Edible Aroids, Amaranth, Yams and Lotus." All of these patents are related and have a common inventor, Karen M. Slimak. Some of the aforementioned patents disclose the use of white sweet potatoes as the primary constituent of a hypoallergenic flour that can be used in lieu of wheat flour. These patents teach that such flour can be used in an infant formula, but make no mention of direct use of the undried and unground vegetable tuber or root in baby food. Other related patents by Ms. Slimak are listed on the Information Disclosure Statement which is filed concurrently herewith.

In the invention of co-pending U.S. patent application Ser. No. 08/741,703 ("the '703 application"), it was discovered that white parsley and celeriac also provide many of the advantages of white carrots. Celeriac (Apium graveolens var. rapaceum) is also known as celery root and has a large root crown of white flesh. A sample of celeriac root crown was analyzed for beta-carotene content and was found to contain less than 1 ppm by weight beta-carotene; specifically, 0.3 ppm by weight. Hamburg parsley (Petroselinium crispum of the family Labiatae, Umelliferae or Apiceae, depending on the authority) is used widely as a culinary herb. Hamburg parsley, sometimes referred to as "Hamburg rooted parsley," "turnip-rooted parsley" or "pietruska," has a well-developed white-fleshed root similar in appearance to roots of carrots and parsnips. A sample of Hamburg parsley root was analyzed for beta-carotene content and was found to contain less than 5 ppm by weight beta-carotene; specifically, 3.2 ppm by weight.

In the '703 application, it was reported that these vegetable roots may be incorporated into the baby food in the manner as described for white carrots. In short, the method described was as employed when orange carrots are used as the whole food filler except that peeled and chopped celeriac root crown or Hamburg parsley root (or both) are substituted for some or all of the orange carrots. In particular, for example, the desired amounts of the food(s), optional orange carrot filler, peeled and chopped celeriac root crown or Hamburg parsley root (or both), and water may be placed in a double boiler cooking pot and heated, such as to about 190° F. to about 200° F. with occasional stirring. Other foods, such as rice may be added during cooking. Once the foods are cooked, they may be removed from the double boiler and, if desired, more water may be added. The resulting mixture then may be blended to produce the baby food.

It was found that celeriac root crown and Hamburg parsley root have so little beta-carotene, are of such light color and mild taste, and are of such good texture and consistency that they make excellent fillers in view of the considerations as described herein.

Parsnips are known in the art to have been used in baby foods. Parsnips are the white or yellowish root of the species Pastinaca sativa. Parsnips can be used in lieu of, or in combination with, orange carrots to reduce beta-carotene levels. Both parsnips and white sweet potatoes have disadvantages that will be discussed below.

However, due to price and availability fluctuations with respect to any particular food product, and further due to the desires for diversity in foods, the need still exists to locate or to develop other baby food fillers that are whole foods, but that are also relatively low in beta-carotene and do not significantly interfere with the color of the baby food imparted by other ingredients. Moreover, the problem in locating appropriate fillers is compounded by the fact that the filler must be suitable for use in a baby food consumption by babies, which requires that the filler not only satisfy the criteria identified above, but also be safe, grindable (or choppable and puree-able either in raw or cooked form), of suitable particulate size, texture and consistency for consumption by babies and to be indistinguishable in the food. Moreover, the density, particle size and other characteristics should be such that the filler does not separate from the other ingredients to settle or rise. And, of course, the filler should not impart undesirable taste. In fact, it is most desirable that the filler have little or no taste, so as not to alter significantly, the taste imparted by the other ingredients of the baby food. In view of these numerous characteristics, it is practically impossible to predict suitability of a particular type of filler candidate other than by a trial and error method.

SUMMARY OF THE INVENTION

Briefly, therefore, the present invention is directed to a novel baby food comprising water and non-bleeding beet roots and a novel method of preparing same.

The present invention is also directed to a novel method for preparation of a baby food. The method comprises mixing together water, at least one food and non-bleeding beet roots to form a mixture, and further treating the mixture, if necessary, to produce a baby food suitable for consumption by babies.

The present invention is further directed to a novel method for preparation of a reduced beta-carotene level baby food, wherein the method comprises mixing together water, at least one pureed food and pureed non-bleeding beet roots to form a mixture, cooking the food mixture to form a cooked food mixture, and comminuting and straining the cooked food mixture to produce a reduced beta-carotene level baby food.

Among the several advantages of the invention may be noted the provision of a baby food in which the fillers are whole food, but which do not contain the high beta-carotene levels resulting when orange carrots are used as the whole food filler; the provision of such baby food of desired color; the provision of such baby food with any of a selection of whole food fillers; the provision of such baby food wherein the filler is suitable for consumption by babies and does not deleteriously affect the taste of the food and other characteristics of the food; and the provision of methods for preparation of such baby foods.

DESCRIPTION OF THE PREFERRED EMBODIMENT

In accordance with the present invention, it has been found that non-bleeding beet roots are light-fleshed vegetable roots that make highly desirable replacements. They not only have little or no beta-carotene and do not significantly interfere with attaining desirable colors in baby foods, but they are safe for consumption by older babies, can be ground to appropriate particle size, texture and consistency for baby foods, are not objectionably distinguishable in the food from the other foods (e.g., it should not feel to the tongue as though small seeds are present) and the filler does not separate from the other ingredients to settle or rise. And, significantly, the non-bleeding beet root does not impart an unacceptable amount of an undesirable taste.

In the previously filed U.S. patent application Ser. No. 08/604,616, now U.S. Pat. No. 5,723,166 it was noted that at that time white and/or yellow carrots were believed to be the best ingredient that can be used in lieu of, or in combination with, orange carrots to control the beta-carotene content and color of baby food. In particular, it was noted that white and/or yellow carrots have a number of advantages as follows: they do not contain psoralen; are not a cumulator crop; have no starch separation problems; can be easily frozen; and are readily available and economical. Furthermore, use of white and/or yellow carrots in baby food that already contains carrots does not require a significant label change such as would be required by the addition of a new ingredient such as parsnips or sweet potatoes.

In the noted application, it was also disclosed that other economically attractive vegetables, e.g., white sweet potatoes and parsnips, have a low beta-carotene content, but also have associated disadvantages not present if white and/or yellow carrots are used.

For example, white sweet potatoes cannot be frozen with the same degree of success as white and/or yellow carrots. The year round availability of ingredients is an important economic consideration to food processors. White sweet potatoes are a starchy material that requires careful processing to convert a portion of the starch to sugars. If the conversion is not achieved, starch separation occurs in the finished product which is unsightly. The unsightly appearance of separated starch leads to consumer complaints.

Freshly harvested sweet potatoes are normally cured by exposure to temperatures of about 85° F. and high relative humidity for about four to seven days to allow the tuber to heal any injuries received during harvesting and handling. During the home baking of sweet potatoes, the gradual rise in the internal temperature of the sweet potato acts first to activate amylolytic (amylose starch hydrolyzing) enzymes naturally present in the sweet potato and later to inactivate these enzymes as the tuber becomes fully cooked. The amylolytic enzymes convert the amylose type of starch into simpler carbohydrate molecules, particularly maltose, which gives the characteristic sweet mellow flavor of baked sweet potatoes.

It is known to those skilled in the art that commercial processing of sweet potatoes into a puree suitable for baby food requires a similar time course of temperature exposure to effect this activation and subsequent inactivation of the amylolytic enzymes present in sweet potatoes, in order to achieve the natural sweet mellow flavor of sweet potatoes and also to reduce the amount of the amylose type of starch, which is known to be more likely to separate from the sterilized sweet potato puree, causing the unsightly phenomenon known as "starch separation."

This commercial processing involves comminuting peeled sweet potatoes, heating the comminuted sweet potatoes to a temperature of no less than about 140° F. and no more than about 180° F., holding the comminuted sweet potatoes at this temperature for a period of time until the desired degree of conversion of amylose starch to simpler carbohydrate has been achieved, and then increasing the temperature of the comminuted sweet potatoes to a temperature equal to or greater than 190° F. to inactivate the amylolytic enzymes. Failure to effect this enzymatic conversion of the amylose starch of sweet potatoes is known to cause "starch separation" in the finished baby food.

Parsnips also have associated disadvantages that are not present in white and/or yellow carrots. Parsnips are grown for their sub-surface root like carrots; however, parsnips have two disadvantages. First, they are known as a cumulator crop. A cumulator crop can draw environmental contaminants, e.g., chlorinated hydrocarbons, from the soil, if any are present, and store them in the edible root. If such substances are present in the parsnip, they are likely to be present in products which use such parsnips as an ingredient. Another disadvantage of parsnips is that they contain psoralen, a substance which is thought to be mutagenic. Psoralen also causes a rash in some individuals. Despite the previous belief that white and yellow carrots, celeriac root crown and Hamburg parsley root were the best whole food fillers in view of the noted considerations and concerns and the noted disadvantages of white sweet potatoes and parsnips, it now has been found that non-bleeding beet root is a highly desirable filler products as well.

Seed for white carrots can be purchased in the United States from Ochoa Seed Company of Gilroy, Calif. Applicant in the co-pending application, Ser. No. 08/604,616, now U.S. Pat. No. 5,723,166 purchased a cultivar of white carrot seed identified as Sunseeds No. W8821 from Ochoa, which was used to grow the white carrots that were used in the experiments described in that application. White forage carrot seed is also available in Europe from Royal Sluis, a seed company in the Netherlands.

In the noted application, it also was reported that it had been discovered that by substituting the relatively low beta-carotene level foods mentioned in that application for at least a portion of the relatively high beta-carotene foods (for example, substituting white carrots, yellow carrots, white sweet potatoes or some combination thereof for orange carrots), therefore, baby foods of a reduced level of beta-carotene (that is a beta-carotene level lower than that of the unsubstituted baby food) can be prepared. As shown in the working examples in the application Ser. No. 08/604,616, now U.S. Pat. No. 5,723,166 reproduced below as Examples 1–5, beta-carotene levels as desired can be selected by selecting the extent of substitution of the relatively high beta-carotene food ingredient by the relatively low beta-carotene level food disclosed in that application. Thus, baby foods of, for instance, less than 20 ppm, or even less than 1 ppm, by weight beta-carotene could be prepared.

It has now been discovered that another food nowhere disclosed or suggested in either noted pending application can achieve such benefits as well. Certain relatively uncommon cultivars of the common beet (Beta vulgaris) are described as "non-bleeding." It has been found that such non-bleeding beet roots may be ground or otherwise comminuted and incorporated into the baby food as discussed with respect to white carrots with similar advantages.

According to the literature, most beets contain two pigments, neither of which is beta-carotene. The deep red color is due to betacyanin. Betaxanthin, a yellow pigment, also may be present. Non-bleeding beets contain virtually no betacyanin and may or may not contain betaxanthin.

Betacyanin, the water-soluble red pigment found in most beets, is such a potent coloring agent that beet root, beet juice and beet root powder are well-accepted food coloring agents. An unexpected advantage of light-fleshed non-bleeding beet roots was that they did not stain clothing and other environmental surfaces during the preparation of purees; purees of red beets stain fabrics, etc. due to the water-soluble pigment.

Both yellow and white beets exist. Yellow garden beet cultivars described in the literature include Burpee Golden, Yellow Turnip, Yellow Tankard and Long Yellow. A white type listed in specialty seed catalogs is Albina Vereduna. The type of non-bleeding beet used as a "typical yellow/white beet" in the trials described here was the common sugar beet.

The beet is a member of the goosefoot plant family (Chenopodiaceae), which also contains two other common vegetables: spinach and Swiss chard. These vegetables accumulate nitrate during growth; nitrate can be converted by bacteria in the gut of the very young infant to nitrite, a toxic substance that can cause the potentially fatal condition methemoglobinemia. However, once the infant is past four months of age, the more mature gastrointestinal tract is much less likely to convert nitrate to nitrite, and beets and spinach can then be safely fed. Thus, beets are an acceptable choice for baby foods intended for infants older than 4 months of age.

Two strained preparations of red beets for infant use, each produced by a different manufacturers with just the two ingredients "beets" and "water," have been available for decades. Despite the popularity of beets in the adult diet and their clinical acceptability for the older infant, strained beets are not a popular vegetable for infants and are not used in any other commercially prepared baby foods. One reason for this appears to be the highly colored water-soluble red pigment of common beets, which stains clothing and furniture upon contact. Suspending as little as 2% of commercial red beet baby food puree in water yields a definite reddish tinge to the clear supernatant. Babies spit up a lot, so baby foods which stain the parent's or the baby's clothes become an avoidable nuisance. The fact that this pigment is water-soluble means that it can be easily removed from solid surfaces. However, removing it from fabrics can be very difficult. Several washings may be necessary to effect a complete removal of the red stain.

"Non-bleeding" beets may be incorporated into the baby food in the manner as described for white carrots. In short, the method is as employed when orange carrots are used as the whole food filler replacements except that peeled and chopped non-bleeding beet roots are substituted for some or all of the orange carrots. In particular, for example, the desired amounts of the food(s), optional orange carrots, peeled, chopped and pureed non-bleeding beet roots, and water may be placed in a double boiler cooking pot and heated, such as to 190° F. or higher with occasional stirring. Other foods, such as meat, poultry, rice or potatoes, may be added before or during cooking. Once the foods are cooked, they may be removed from the double boiler and, if desired, more water may be added. The resulting mixture then may be blended to produce the baby food.

It has been found that non-bleeding beet roots have so little carotene and red pigment, are of such light color and acceptable taste, and are of such good texture and consistency and other characteristics as discussed above that they make an excellent filler replacement in view of the considerations as described herein.

In order to test the feasibility of using white carrots in lieu of, or in combination with, orange carrots, Applicant in application Ser. No. 08/604,616 now U.S. Pat. No. 5,723,166 conducted a number of pilot plant experiments which are designed to mimic full scale production. Five products were tested as follows: 1. Beef Dinner Supreme@; 2. Macaroni & Beef Dinner; 3. Turkey-Rice Dinner; 4. Vegetable-Beef Dinner; and 5. Mixed Vegetables. For each product that was tested, five samples were prepared. Different percentages of white carrots were added to four of the samples to determine the effects on beta-carotene levels and the color of the product. The first carrot combination included 75% orange and 25% white carrots; the second included 50% orange and 50% white. The third included 25% orange and 75% white; and the fourth formula included 100% white carrots. As a control, one sample with 100% orange carrots was also produced. These products are discussed in Examples 1–5 below. Example 6 below describes tests carried out with Hamburg parsley root and celeriac. Examples 7–11 describe tests carried out with the fillers of this invention.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLE 1

Five different samples of Beef Dinner Supreme were prepared in the pilot plant and assigned numbers PP5530, PP5531, PP5532, PP5533 and PP5534. These samples had the characteristics shown in Table 1 below.

TABLE NO. 1

Beef Dinner Supreme

| Sample Number | Relative Proportions of | | Beta Carotene ppm | Beta Carotene Expressed As Vit. A % DV/serv. |
|---|---|---|---|---|
| | Orange Carrots | White Carrots | | |
| PP5530 | 100% | 0% | 33.1 | 416% |
| PP5531 | 75% | 25% | 30.9 | 388% |
| PP5532 | 50% | 50% | 14.4 | 180% |
| PP5533 | 25% | 75% | 8.2 | 102% |
| PP5534 | 0% | 100% | 0.2 | 3% |

The data reported in the column headed "Beta-Carotene, ppm" were generated by HPLC separation of the beta-carotene in the product. The figures in the column headed "Beta Carotene Expressed As Vit. A %DV/serv." were calculated from the beta-carotene content using the conversion factor of 1 IU per 0.6 mcg of beta-carotene, allowing for the RDI of 1500 IU for infants and a 113-gram (4-ounce) serving size. These latter figures thus represent the total provitamin A activity contributed by the beta-carotene analytically determined to be present in these samples. Sample PP5530, produced with 100% orange carrots, contains by analysis beta-carotene equivalent to 416% of the recommended amount of vitamin A to be consumed by a baby on a daily basis. In sharp contrast, Sample PP5534 which was produced with 100% white carrots contains by analysis beta-carotene equivalent to 3% of the Daily Value.

By way of further comparison, the label for Beef Dinner Supreme currently produced by Beech-Nut has a declared vitamin A Daily Value of 240%. The current commercial formula for Beef Dinner Supreme used by Beech-Nut uses 100% orange carrots. This label declaration may vary from HPLC analytical results on a given sample because of several factors as follows: 1) Label declarations are based on analyses of composite samples (one composite per year). 2) Label declarations are normally based on an average of three years of samples. 3) Federal regulations require that no analytical value for vitamin A may be less than 80% of the declared value, thus leading to a claim significantly less than the arithmetic average. 4) Use of the official AOAC method which also measures alpha-carotene rather than the HPLC method for beta-carotene separation and analysis.

The color of the baby food was measured on a Hunterlab Colormeter. This apparatus measures color based on the Opponent Colors Theory, which assumes there are 3 receptors in the human eye which receive opposing color signals perceived as: 1) Light-Dark; 2) Red-Green and 3) Yellow-Blue. This is a three-dimensional system similar to Munsell, except that the dimensions are rectangular, not cylindrical. The dimensions of this system are considered to correspond most closely to the visual signals from eye to brain. The color is defined using the units of measure L, a and b. The "L" measure can vary from 0 to 100. These five samples of Beef Dinner Supreme exhibited the color characteristics as shown in Table 2 below.

TABLE NO. 2

Beef Dinner Supreme
Hunterlab Colormeter Results

| Sample | L | a | b |
|---|---|---|---|
| PP5530 | 50.14 | 10.15 | 31.07 |
| PP5531 | 51.93 | 9.43 | 31.28 |
| PP5532 | 53.28 | 7.50 | 30.11 |
| PP5533 | 53.16 | 6.02 | 27.89 |
| PP5534 | 55.51 | 2.67 | 20.00 |

Pilot Plant Preparation of Sample PP5530

The pilot plant produced these samples on a batch basis, each batch weighing approximately 100 lbs. The pilot plant procedures are designed to mimic commercial scale production. However, the two procedures are not identical. Commercial production will also be done on a batch basis, each batch ordinarily weighing approximately 3,000 lbs. The procedures for commercial production will be discussed in greater detail below.

Pilot plant production of sample number 5530 for a Beef Dinner Supreme was accomplished using a two step procedure i.e., first, a vegetable puree containing carrots and green beans is prepared; second, the vegetable puree is combined with other ingredients to produce the Beef Dinner Supreme. Sample number 5530 used a formula with 100% orange carrots. The vitamin A analysis was 416% of the Daily Value per serving.

Step-One—Pilot Plant Puree Production

Eighty lbs. of frozen orange carrots and 10 lbs. of frozen green beans were placed in a Fitzpatrick Comminutor, Model No. D, at medium speed and a temperature of 195° F.–205° F. (200° F. target). Approximately 22.5 lbs. of water were added through steam injection, resulting in a total batch weight of 112.5 lbs. The spinning knives in the Comminutor and the injected steam comminute the frozen vegetables into a puree that passes through a 3/16" or 1/4" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable n puree, most of which is insoluble. Technical personnel then calculate the weight of puree to be added in order to deliver 5.7 lbs. of vegetable puree total solids to the batch.

Step Two—Pilot Plant Manufacturing Procedure for the Product

Technical personnel sampled the aforementioned vegetable puree in the holding tank and determined that it had a total solids content of 9.12%. Personnel then make the following calculation: 5.7 lbs. is divided by 0.0912 (total solids content of puree), resulting in 62.5 lbs. of vegetable puree that needs to be added to the batch. Based on this calculation, personnel placed 62.5 lbs. of the aforementioned vegetable puree from the holding tank and 11.3 lbs. of batch water in a Koven Kettle that is capable of holding 300 lbs. of product. The other ingredients are then added in no particular order as follows: 12 lbs. of frozen ground beef; 3.5 lbs. of frozen corn, and 2.7 lbs. of dehydrated 1/4" diced potatoes. Using steam injection, all of the ingredients are cooked in the Koven Kettle at about 212° F. for about 10 minutes. When temperatures exceed 210° F. in the kettle, pressure is developed because it is a sealed pressure vessel. About 2.9 lbs. of water are added to the batch via the steam injection. The product is transferred from the Koven Kettle to a stockpot and weighed. Additional water, if necessary, is added to bring the product weight to 100 lbs. In this case, 5.1 lbs. of water were added to the batch to achieve a total weight of 100 lbs.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Beef Dinner Supreme is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5531

This version of Beef Dinner Supreme used a formula containing 75% orange carrots and 25% white carrots. The vitamin A analysis was 388% of the Daily Value per serving.

Step One—Pilot Plant Puree Production

Sixty lbs. of frozen orange carrots, 20 lbs. of frozen white carrots, and 10 lbs. of frozen green beans were placed in an Fitzpatrick Comminutor at medium speed and a temperature of 195° F. to 205° F. (200° F. target). Approximately 18.9 lbs. of water were added through steam injection in the Comminutor, resulting in a total batch weight of 108.9 lbs. The puree was thereafter processed in the same manner outlined above concerning Sample PP5530.

Step Two—Pilot Plant Manufacturing Procedures for the Product

Technical personnel sampled the aforementioned vegetable puree in the holding tank and determined that it had a total solids content of 9.13%. Personnel then make the following calculation: 5.7 lbs. is divided by 0.0913 (total solids content of puree), resulting in 62.45 lbs. of vegetable puree that needs to be added to the batch. Based on this calculation, personnel placed 62.45 lbs. of the aforementioned vegetable puree and 11.4 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the ingredients are cooked in the Koven Kettle at about 212° F. for 10 minutes. About 4.7 lbs. of water were added to the batch via the steam injection. The product is transferred from the Koven Kettle to a stockpot and weighed. Additional water, if necessary, is added to bring the product weight to 100 lbs. In this case, 3.3 lbs. of water were added to the batch to achieve a total weight of 100 lbs. The product was thereafter processed in the same manner outlined above concerning Sample PP5530.

Pilot Plant Production of Sample PP5532

This sample Beef Dinner Supreme was prepared using a combination of 50% orange carrots and 50% white carrots. The vitamin A analysis was 180% of the Daily Value per serving.

Step One—Pilot Plant Puree Production

Forty lbs. of frozen orange carrots, 40 lbs. of frozen white carrots, and 10 lbs. of frozen green beans were placed in a Fitzpatrick Comminutor at medium speed and a temperature of 195° F. to 205° F. (200° F. target). Approximately 17.45 lbs. of water were added through steam injection, resulting in a total batch weight of 107.45 lbs. The puree was thereafter processed in the same manner outlined above concerning Sample PP5530.

Step Two—Pilot Plant Manufacturing Procedures for the Product

Technical personnel sampled the aforementioned vegetable puree in the holding tank and determined that it had a total solids content of 9.39%. Personnel then make the following calculation: 5.7 lbs. is divided by 0.0939 (total solids content of puree), resulting in 60.7 lbs. of vegetable puree that needs to be added to the batch. Based on this calculation, personnel placed 60.7 lbs. of the aforementioned vegetable puree and 13.1 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.5 lbs. of water are added to the batch via the steam injection. The product is transferred from the Koven Kettle to a stockpot and weighed. Additional water, if necessary, is added to bring the product weight to 100 lbs. In this case, 3.5 lbs. of water was added to the batch to achieve a total weight of 100 lbs. The product was thereafter processed in the same manner outlined above concerning Sample PP5530.

Pilot Plant Production of Sample PP5533

This sample Beef Dinner Supreme was prepared using a combination of 25% orange carrots and 75% white carrots. The vitamin A analysis was 102% of the Daily Value per serving.

Step One—Pilot Plant Puree Production.

Twenty lbs. of frozen orange carrots, 60 lbs. of frozen white carrots, and 10 lbs. of frozen green beans were placed in a Fitzpatrick Comminutor, Model No. D, at medium speed and a temperature of 195° F. to 205° F. (200° F. target). Approximately 13.95 lbs. of water were added through steam injection, resulting in a total batch weight of 103.95 lbs. The puree was thereafter processed in the same manner outlined above concerning Sample PP5530.

Step Two—Pilot Plant Manufacturing Procedures for the Product

Technical personnel sampled the aforementioned vegetable puree in the holding tank and determined that it had a total solids content of 9.39%. Personnel then make the following calculation: 5.7 lbs. is divided by 0.0939 (total solids content of puree), resulting in 60.7 lbs. of vegetable puree that needs to be added to the batch. Based on this calculation, personnel placed 60.7 lbs. of the aforementioned vegetable puree and 13.1 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.3 lbs. of water are added to the batch via the steam injection. The product is transferred from the Koven Kettle to a stockpot and weighed. Additional water, if necessary, is added to bring the product weight to 100 lbs. In this case, 3.7 lbs. of water was added to the batch to achieve a total weight of 100 lbs. The product was thereafter processed in the same manner outlined above concerning Sample PP5530.

Pilot Plant Production of Sample PP5534

This sample Beef Dinner Supreme was prepared using 100% white carrots. The vitamin A analysis was 3% of the Daily Value per serving.

Step One—Pilot Plant Puree Production

Eighty lbs. of frozen white carrots and 10 lbs. of frozen green beans were placed in a Fitzpatrick Comminutor, Model No. D, at medium speed and a temperature of 195° F. to 205° F. (200° F. target). Approximately 13 lbs. of water were added through steam injection, resulting in a total batch weight of 103 lbs. The puree was thereafter processed in the same manner outlined above concerning Sample PP5530.

Step Two—Pilot Plant Manufacturing Procedures for the Product

Technical personnel sampled the aforementioned vegetable puree in the holding tank and determined that it had a total solids content of 8.97%. Personnel then make the following calculation: 5.7 lbs. is divided by 0.0897 (total solids content of puree), resulting in 63.5 lbs. of vegetable puree that needs to be added to the batch. Based on this calculation, personnel placed 63.5 lbs. of the aforementioned vegetable puree and 10.3 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.9 lbs. of water are added to the batch via the steam injection. The product is transferred from the Koven Kettle to a stockpot and weighed. Additional water, if necessary, is added to bring the product weight to 100 lbs. In this case, 3.1 lbs. of water were added to the batch to achieve a total weight of 100 lbs. The product was thereafter processed in the same manner outlined above concerning Sample PP5530.

Commercial Production of Beef Dinner Supreme

A Beef Dinner Supreme may be produced on a commercial basis using a 100% white carrot formula as follows:

| Ingredients | Percentage by weight theoretical | Weight/Batch |
|---|---|---|
| carrots, frozen (adjusted to provide 12% total solids) | 40.0 | 1200 lbs. |
| beet, frozen | 12.0 | 360 lbs. |
| green beans, frozen | 5.0 | 150 lbs. |
| corn, frozen | 3.5 | 105 lbs. |
| potatoes, dehydrated | 2.7 | 80 lbs. |
| batch water, estimated | 16.7 | 502 lbs. |
| water from steam injection, estimated | 20.1 | 603 lbs |
|  | 100% | 3,000 lbs. |

Carrot puree or peeled fresh carrot may be substituted in the above formula for frozen carrots. If carrot puree issubstituted, the weight of the carrot puree added to the batch is variable depending on the total solids of the carrot puree.

The following two-step method will be used in commercial production of a 3,000 lbs. batch. First, a vegetable puree is prepared using frozen carrots and frozen green beans. In the second step, the vegetable puree is combined with other ingredients to produce the baby food in commercial quantities.

Step-One Commercial Puree Production

Twelve hundred lbs. of frozen white carrots and 150 lbs. of frozen green beans are placed in a Fitzpatrick Comminutor, Model No. F-20, at medium speed and a temperature of 200° F.–210° F. (205° F. target). Approximately 270 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.00% is necessary, however, a target total solids of 9.00%–9.49% is desired.

Step Two—Commercial Manufacturing Procedures for the Product

The amount of vegetable puree used in commercial production and the amount of batch water varies based on the total solids content in the vegetable puree. The amount of vegetable puree and batch water is selected based on the following adjustment table.

TABLE NO. 3

VEGETABLE PUREE/BATCH WATER ADJUSTMENT TABLE

| Total Solids Vegetable Puree | Lbs. Vegetable Puree | Lbs. Batch Water |
|---|---|---|
| 7.00%–7.49% (Minimum) | 2152 | 53 |
| 7.50%–7.99% | 2013 | 192 |
| 8.00%–8.49% | 1891 | 314 |
| 8.50%–8.99% | 1782 | 423 |
| 9.00%–9.49% Target | 1678 | 527 |

TABLE NO. 3-continued

VEGETABLE PUREE/BATCH WATER ADJUSTMENT TABLE

| Total Solids Vegetable Puree | Lbs. Vegetable Puree | Lbs. Batch Water |
|---|---|---|
| 9.50%–9.99% | 1600 | 605 |
| 10.00%–0.49% | 1522 | 683 |
| 10.50%–0.99% | 1451 | 754 |
| 11.00%–11.49% | 1387 | 818 |
| 11.50%–12.00% | 1328 | 877 |

Assuming a total solids content of 9.0%–9.49%, 1,678 lbs. of vegetable puree and 527 lbs. of batch water are placed in a Koven Kettle, having a capacity of 3,000 lbs. of product. The other ingredients are then added in no particular order as follows: 360 lbs. of frozen ground beef, 105 lbs. of frozen corn and 80 lbs of ¼" diced dehydrated potatoes. Using steam injection, all of the ingredients are cooked in a Koven Kettle at about 212° F. for about 10 minutes. Approximately 250 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Beef Dinner Supreme is then placed in glass jars and further processed in a conventional manner and as required by 21 C.F.R. §113.

EXAMPLE 2

Five different samples of Turkey-Rice Dinner were prepared at the pilot plant and assigned numbers PP5513, PP5514, PP5515, PP5516 and PP5517. These samples had the characteristics shown in Tables 4 and 5 below:

TABLE NO. 4

Turkey Rice Dinner

| Sample Number | Relative Proportions of | | Beta Carotene ppm | Beta Carotene Expressed As Vit. A % DV/serv. |
|---|---|---|---|---|
| | Orange Carrots | White Carrots | | |
| PP5513 | 100% | 0% | 38.8 | 488% |
| PP5514 | 75% | 25% | 26.5 | 332% |
| PP5515 | 50% | 50% | 17.7 | 222% |
| PP5516 | 25% | 75% | 13.1 | 165% |
| PP5517 | 0% | 100% | 0.2 | 2% |

TABLE NO. 5

Turkey-Rice Dinner
Hunterlab Colormeter Results

| Sample | L | a | b |
|---|---|---|---|
| PP5513 | 53.6 | 11.23 | 31.37 |
| PP5514 | 52.83 | 9.76 | 29.86 |
| PP5515 | 54.16 | 8.16 | 28.58 |
| PP5516 | 53.91 | 7.42 | 26.08 |
| PP5517 | 52.87 | 5.50 | 19.18 |

Pilot Plant Preparation of Sample PP5513

The pilot plant produced these samples on a batch basis, each batch weighing approximately 100 lbs. Pilot plant production of sample number 5513 for a Turkey-Rice Dinner was accomplished using a two step procedure i.e., first, a carrot puree is prepared; second, the carrot puree is combined with other ingredients to produce the Turkey-Rice Dinner. Sample number 5513 used a formula with 100% orange carrots. The vitamin A analysis was 488% of the Daily Value per serving.

Step One—Pilot Plant Puree Production

Seventy-five lbs. of frozen orange carrots were placed in a Fitzpatrick Comminutor, Model No. D, at medium speed and a temperature of 195° F–205° F. (200° F. target). Approximately 20.5 lbs. of water were added through steam injection, resulting in a total batch weight of 95.5 lbs. The spinning knives in the Comminutor and the injected steam comminute the frozen vegetables into a puree that passes through a 3/16" or 1/4" screen. The puree is then twice passed through a Stephan Microcutter, Model No. MC-12, equipped with a 0.05–0.10 mm ring. The resulting puree is transferred to a holding tank and is sampled for total solids. The term total solids includes the carbohydrate and cellulose contents of the vegetable puree, most of which is insoluble. Technical personnel then calculate the weight of puree to be added in order to deliver 6.0 lbs. of puree total solids to the batch.

Step Two—Pilot Plant Manufacturing Procedure for the Product

Technical personnel sampled the aforementioned vegetable puree in the holding tank and determined that it had a total solids content of 9.44%. Personnel then make the following calculation: 6.0 lbs. is divided by 0.0944 (total solids content of puree), resulting in 63.55 lbs. of puree that needs to be added to the batch. Based on this calculation, personnel placed 63.55 lbs. of the aforementioned puree from the holding tank and 15.0 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F–220° F. for about 20 minutes. When temperatures exceed 210° F. in the kettle, pressure is developed because it is a sealed pressure vessel. About 4.1 lbs. of water are added to the batch via the steam injection. The product is transferred from the Koven Kettle to a stockpot and weighed. Additional water, if necessary, is added to bring the product weight to 100 lbs. In this case, 3.9 lbs. of water were added to the batch to achieve a total weight of 100 lbs.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Turkey-Rice Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5514

This version of Turkey-Rice Dinner used a formula containing 75% orange carrots and 25% white carrots. The vitamin A analysis was 332% of the Daily Value per serving.

Step One—Pilot Plant Puree Production

Fifty-six and a quarter lbs. of frozen orange carrots, 18.75 lbs. of frozen white carrots were placed in a Fitzpatrick Comminutor at medium speed and a temperature of 195° F. to 205° F. (200° F. target). Approximately 16 lbs. of water were added through steam injection in the Comminutor, resulting in a total batch weight of 91 lbs. The puree was thereafter processed in the same manner outlined above concerning Sample PP5513.

Step Two—Pilot Plant Manufacturing Procedures for the Product

Technical personnel sampled the aforementioned carrot puree in the holding tank and determined that it had a total solids content of 9.58%. Personnel then make the following calculation: 6.0 lbs. is divided by 0.0958 (total solids content of puree), resulting in 62.65 lbs. of puree that needs to be added to the batch. Based on this calculation, personnel placed 62.65 lbs. of the aforementioned carrot puree and 15.85 lbs. of batch water in a Koven Kettle that is capable of holding 300 lbs. of product. The other ingredients are then added in no particular order as follows: 10 lbs. of frozen turkey, 3.5 lbs. of medium grain rice. Using steam injection, all of the ingredients are cooked in the Koven Kettle at about 215° F. to 220° F. for 20 minutes. About 7.0 lbs. of water were added to the batch via the steam injection. The product is transferred from the Koven Kettle to a stockpot and weighed. Additional water, if necessary, is added to bring the product weight to 100 lbs. In this case, one lb. of water was added to the batch to achieve a total weight of 100 lbs. The product was thereafter processed in the same manner outlined above concerning Sample PP5513.

Pilot Plant Preparation of Sample PP5515

This version of Turkey-Rice Dinner used a formula containing 50% orange carrots and 50% white carrots. The vitamin A analysis was 222% of the Daily Value per serving.

Step One—Pilot Plant Puree Production

Thirty-seven and one-half lbs. of frozen orange carrots and 37.5 lbs. of frozen white carrots were placed in a Fitzpatrick Comminutor at medium speed and a temperature of 195° F. to 205° F. (200° F. target). Approximately 15.7 lbs. of water were added through steam injection in the Comminutor, resulting in a total batch weight of 91 lbs. The puree was thereafter processed in the same manner outlined above concerning Sample PP5513.

Step Two—Pilot Plant Manufacturing Procedures for the Product

Technical personnel sampled the aforementioned carrot puree in the holding tank and determined that it had a total solids content of 9.71%. Personnel then make the following calculation: 6.0 lbs. is divided by 0.0971 (total solids content of puree), resulting in 61.8 lbs. of puree that needs to be added to the batch. Based on this calculation, personnel placed 61.8 lbs. of the aforementioned carrot puree and 16.7 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 6.2 lbs. of water were added to the batch via the steam injection. The product is transferred from the Koven Kettle to a stockpot and weighed. Additional water, if necessary, is added to bring the product weight to 100 lbs. In this case, 1.8 lbs. of water was added to the batch to achieve a total weight of 100 lbs. The product was thereafter processed in the same manner outlined above concerning Sample PP5513.

Pilot Plant Preparation of Sample PP5516

This version of Turkey-Rice Dinner used a formula containing 25% orange carrots and 75% white carrots. The vitamin A analysis was 165% of the Daily Value per serving.

Step One—Pilot Plant Puree Production

Eighteen and three quarters lbs. of frozen orange carrots and 56.25 lbs. of frozen white carrots were placed in a Fitzpatrick Comminutor at medium speed and a temperature of 195° F. to 205° F. (200° F. target). Approximately 13.8 lbs. of water were added through steam injection in the Comminutor, resulting in a total batch weight of 88.8 lbs. The puree was thereafter processed in the same manner outlined above concerning Sample PP5513.

Step Two—Pilot Plant Manufacturing Procedures for the Product

Technical personnel sampled the aforementioned puree in the holding tank and determined that it had a total solids content of 9.41%. Personnel then make the following calculation: 6.0 lbs. is divided by 0.0941 (total solids content of puree), resulting in 63.75 lbs. of carrot puree that needs to be added to the batch. Based on this calculation, personnel placed 63.75 lbs. of the aforementioned vegetable puree and 14.75 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 7.2 lbs. of water were added to the batch via the steam injection. The product is transferred from the Koven Kettle to a stockpot and weighed. Additional water, if necessary, is added to bring the product weight to 100 lbs. In this case, 0.8 lbs. of water were added to the batch to achieve a total weight of 100 lbs. The product was thereafter processed in the same manner outlined above concerning Sample PP5513.

Pilot Plant Preparation of Sample PP5517

This version of Turkey-Rice Dinner used a formula containing 100% white carrots. The vitamin A analysis was 2% of the Daily Value per serving.

Step One—Pilot Plant Puree Production

Seventy-five lbs. of frozen white carrots were placed in a Fitzpatrick Comminutor at medium speed and a temperature of 195° F. to 205° F. (200° F. target). Approximately 12.1 lbs. of water were added through steam injection in the Comminutor, resulting in a total batch weight of 87.1 lbs. The puree was thereafter processed in the same manner outlined above concerning Sample PP5513.

Step Two—Pilot Plant Manufacturing Procedures for the Product

Technical personnel sampled the aforementioned puree in the holding tank and determined that it had a total solids content of 9.44%. Personnel then make the following calculation: 6.0 lbs. is divided by 0.0944 (total solids content of puree), resulting in 63.55 lbs. of carrot puree that needs to be added to the batch. Based on this calculation, personnel placed 63.55 lbs. of the aforementioned carrot puree and 14.95 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 8.2 lbs. of water were added to the batch via the steam injection. The product is transferred from the Koven Kettle to a stockpot and weighed. Additional water, if necessary, is added to bring the product weight to 100 lbs. In this case, no additional water was added to the batch to achieve a total weight of 100 lbs. The product was thereafter processed in the same manner outlined above concerning Sample PP5513.

Commercial Production of Turkey-Rice Dinner With White Carrots

A Turkey-Rice Dinner With White Carrots may be produced on a commercial basis using a 100% white carrot formula as follows:

| Ingredients | Percentage by weight theoretical | Weight/Batch |
|---|---|---|
| carrots, frozen (adjusted to provide 12% total solids) | 50.0 | 1500 lbs. |
| turkey, frozen | 10.0 | 300 lbs. |
| rice, medium grain | 3.5 | 105 lbs. |
| batch water, estimated | 15.5 | 465 lbs. |
| water from steam injection, estimated | 21.0 | 630 lbs. |
| | 100% | 3,000 lbs. |

Carrot puree or peeled fresh carrot may be substituted in the above formula for frozen carrots. If carrot puree is substituted, the weight of carrot puree added to the batch is variable, depending on the total solids of the carrot puree.

The following two-step method will be used in commercial production of a 3,000 lbs. batch. First a puree is prepared using frozen carrots. In the second step, the puree is combined with other ingredients to produce the baby food in commercial quantities.

Step One—Commercial Puree Production

Fifteen hundred lbs of frozen white carrots are placed in a Fitzpatrick Comminutor, Model No. F-20, at medium speed and a temperature of 200° F.–210° F. (205° F. target). Approximately 300 lbs of water are added through steam injection. The spinning knives in the Comminutor and the injected steam comminute the frozen vegetables into a puree that passes through a ½" square hold screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.50% is necessary, however, a target total solids of 9.00%–9.49% is desired.

Step Two—Commercial Manufacturing Procedures for the Product

The amount of puree used in Commercial production and the amount of batch water varies based on the total solids content in the puree. The amount of vegetable puree and batch water is selected based on the adjustment table listed below.

TABLE NO. 6

CARROT PUREE/BATCH WATER ADJUSTMENT TABLE

| Total Solids Carrot Puree | Lbs. Carrot Puree | Lbs. Batch Water |
|---|---|---|
| 7.50%–7.99% (Minimum) | 2324 | — |
| 8.00%–8.49% | 2250 | 90 |
| 8.50%–8.99% | 2118 | 222 |
| 9.00%–9.49% Target | 2000 | 340 |
| 9.50%–9.99% | 1895 | 445 |
| 10.00%–10.49% | 1800 | 540 |
| 10.50%–10.99% | 1714 | 626 |
| 11.00%–11.49% | 1636 | 704 |

Assuming a total solids content of 9.0%–9.49%, 2,000 lbs. of puree and 340 lbs. of batch water are placed in a Koven Kettle, having a capacity of 3,000 lbs. of product. The other ingredients are then added in no particular order as follows: 300 lbs. of frozen turkey and 105 lbs. of medium grain rice. Using steam injection, all of the ingredients are cooked in a Koven Kettle at about 215° F. for about 20 minutes. Approximately 255 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.0501" opening. The Turkey-Rice Dinner With White Carrots is then placed in glass jars and further processed in a conventional manner and as required by 21 C.F.R. §113.

In addition to the aforementioned samples that were prepared at the pilot plant with white carrots, another series of eight samples of Turkey-Rice Dinner was prepared using white sweet potatoes and assigned numbers 5308, 5328, 5346, 5347, 5348, 5349, 5350 and 5382. The white sweet potatoes were obtained from growers in North Carolina. Varieties and types tested include "White Delight" and "Jersey Sweets." "Hayman" sweet potatoes are another acceptable cultivar.

TABLE NO. 7

Turkey-Rice Dinner With White Sweet Potatoes

| Sample Number | Relative Proportions of Orange Carrots | Relative Proportions of White Sweet Potatoes | Beta Carotene ppm | Beta Carotene Expressed As Vit. A % DV/serv. |
|---|---|---|---|---|
| PP5308 | 0 | 100 (1) | 0.8 | 10 |
| PP5328 | 0 | 100 (1) | 1.0 | 13 |
| PP5346 | 0 | 100 (1) | 2.0 | 25 |
| PP5347 | 0 | 100 (2) | 2.9 | 37 |
| PP5348 | 10 | 90 (1) | 7.9 | 99 |
| PP5349 | 20 | 80 (1) | 12.0 | 150 |
| PP5350 | 30 | 70 (1) | 17.9 | 224 |
| PP5382 | 0 | 100 (1) | 2.2 | 27 |

(1) White Delight sweet potatoes
(2) Jersey Sweets white sweet potatoes

TABLE NO. 8

Turkey-Rice Dinner With White Sweet Potatoes Hunterlab Colormeter Results

| Sample | L | a | b |
|---|---|---|---|
| PP5308 | 51.59 | 4.31 | 19.02 |
| PP5328 | 47.72 | 6.54 | 20.93 |
| PP5346 | 45.60 | 6.89 | 21.15 |
| PP5347 | 45.93 | 6.74 | 21.73 |
| PP5348 | 43.90 | 7.90 | 23.24 |
| PP5349 | 44.86 | 9.17 | 24.38 |
| PP5350 | 44.44 | 10.53 | 25.35 |
| PP5382 | 44.89 | 6.53 | 20.36 |

Pilot Plant Preparation of Sample PP5308

The pilot plant produced these samples on a batch basis, each batch weighing approximately 100 lbs. Pilot plant production of sample number 5308 for a Turkey-Rice Dinner was accomplished using a two step procedure i.e., first, a white sweet potato puree is prepared; second, the white sweet potato puree is combined with other ingredients to produce the Turkey-Rice Dinner. Sample number PP5308 used a formula with 100% fresh white sweet potatoes. The vitamin A analysis was 10% of the Daily Value per serving.

Step One—Pilot Plant Puree Production

Sixty-nine and a quarter lbs. of fresh white sweet potatoes were placed in a Fitzpatrick Comminutor, Model No. D, at medium speed and a temperature of 200° F.–210° F. (205° F. target). Approximately 7.4 lbs. of water were added through steam injection, resulting in a total batch weight of 76.6 lbs. The spinning knives in the Comminutor and the injected steam comminute the sweet potatoes into a puree that passes through a 3/16" or 1/4" screen. The puree is then twice passed through a Stephan Microcutter, Model No. MC-12, equipped with a 0.05–0.10 mm ring. The resulting puree is transferred to a holding tank and is sampled for total solids. The term total solids includes the carbohydrate and cellulose contents of the vegetable puree, most of which is insoluble. Technical personnel then calculate the weight of puree to be added in order to deliver 14.5 lbs. of puree total solids to the batch.

Step Two—Pilot Plant Manufacturing Procedure for the Product

Technical personnel sampled the aforementioned sweet potato puree in the holding tank and determined that it had a total solids content of 25.86%. Personnel then make the following calculation: 14.5 lbs. is divided by 0.2586 (total solids content of puree), resulting in 56.1 lbs. of puree that needs to be added to the batch. Based on this calculation, personnel placed 56.1 lbs. of the aforementioned puree from the holding tank and 22.4 lbs. of batch water in a Koven Kettle that is capable of holding 300 lbs. of product. The other ingredients are then added in no particular order as follows: 10 lbs. of minced turkey and 3.5 lbs. of medium grain rice. Using steam injection, all of the ingredients are cooked in the Koven Kettle at 210° F. for about 10 minutes. When temperatures exceed 210° F. in the kettle, pressure is developed because it is a sealed pressure vessel. About 8.0 lbs. of water are added to the batch via the steam injection. The product is transferred from the Koven Kettle to a stockpot and weighed. Additional water, if necessary, is added to bring the product weight to 100 lbs. In this case, 8.7 lbs. of water were added to the batch to achieve a total weight of 100 lbs.

The product is first microcut using a Stephan Microcutter, Model No. MC-12, equipped with a 0.75 mm ring; the product is microcut a second time using a 0.75 mm ring. The product is then strained twice through an orifice having a 0.05" opening. The Turkey Rice Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference. This sample had a thick consistency; however, flavor was good.

Pilot Plant Preparation of Sample PP5328

This version of Turkey-Rice Dinner used a formula containing fresh white sweet potatoes. The vitamin A analysis was 13% of the Daily Value per serving.

Step One—Pilot Plant Puree Production

Fifty lbs. of fresh white sweet potatoes were placed in a Fitzpatrick Comminutor at medium speed and a temperature of 145° F. to 180° F., 180° F. maximum. The puree was thereafter processed in the same manner outlined above concerning Sample PP5308. The amount of puree recovered was 43.6 lbs. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product

Personnel placed 43.6 lbs. of the aforementioned puree and 30.9 lbs. of batch water in a Koven Kettle that is capable of holding 300 lbs. of product. The puree was heated to 170°–185° F. and held for five minutes. The other ingredients are then added in no particular order as follows: 10 lbs. of minced turkey, 3.5 lbs. of medium grain rice. Using steam injection, all of the ingredients are cooked in the Koven Kettle at about 210° F. for 10 minutes. About 9.2 lbs. of water were added to the batch via the steam injection. This product appeared thin after processing in the Koven Kettle. No additional water was added to the batch after the Koven Kettle which weighed 97.20 lbs. The rice was not fully cooked using this procedure. The product was thereafter processed in the same manner outlined above concerning Sample PP5308.

Pilot Plant Preparation of Sample PP5346

This version of Turkey-Rice Dinner used a formula containing fresh white sweet potatoes called "Jersey Sweets." The vitamin A analysis was 25% of the Daily Value per serving.

Step One—Pilot Plant Puree Production

Seventy-five lbs. of fresh white sweet potatoes were placed in a Fitzpatrick Comminutor at medium speed and a temperature of 145° F. to 180° F., maximum 180° F. The puree was thereafter processed in the same manner outlined above concerning Sample PP5308. A total of 72.2 lbs. of sweet potato puree were recovered. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product

Technical personnel sampled the aforementioned sweet potatoes puree in the holding tank and determined that it had a total solids content of 26.57%. Personnel then make the following calculation: 14.0 lbs. is divided by 0.2657 (total solids content of puree), resulting in 52.70 lbs. of puree that needs to be added to the batch. Based on this calculation, personnel placed 52.7 lbs. of the aforementioned puree and 26.80 lbs. of batch water in a Koven Kettle that is capable of holding 300 lbs. of product. The puree was heated in the Koven Kettle to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 9 lbs. of water were added to the batch via the steam injection. The product is transferred from the Koven Kettle to a stockpot. The batch weighed 102.0 lbs. The product was thereafter processed in the same manner outlined above concerning Sample PP5308.

Pilot Plant Preparation of Sample PP5347

This version of Turkey-Rice Dinner used a formula containing fresh White Delight sweet potatoes. The vitamin A analysis was 37% of the Daily Value per serving.

Step One—Pilot Plant Puree Production

Seventy-five lbs. of fresh white sweet potatoes were placed in a Fitzpatrick Comminutor at medium speed and a temperature of 145° F. to 180° F., 180° F. maximum. Approximately 4.6 lbs. of water were added through steam injection in the Comminutor, resulting in a total batch weight of 79.6 lbs. The puree was thereafter processed in the same manner outlined above concerning Sample PP5308.

Step Two—Pilot Plant Manufacturing Procedures for the Product

Technical personnel sampled the aforementioned puree in the holding tank and determined that it had a total solids content of 23.29%. Personnel then make the following calculation: 14.0 lbs. is divided by 0.2329 (total solids content of puree), resulting in 60.1 lbs. of puree that needs to be added to the batch. Based on this calculation, personnel placed 60.1 lbs. of the aforementioned puree and 19.4 lbs. of batch water in a Koven Kettle that is capable of holding 300 lbs. of product. The puree was then heated to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 7.3 lbs. of water were added to the batch via the steam injection. The product is transferred from the Koven Kettle to a stockpot. The batch weighed 100.30 lbs. The product was thereafter processed in the same manner outlined above concerning Sample PP5308.

Pilot Plant Preparation of Sample PP5348

This version of Turkey-Rice Dinner used a formula containing a ratio of 90% fresh White Delight sweet potatoes to 10% frozen orange carrots. The vitamin A analysis was 99% of the Daily Value per serving.

Step One—Pilot Plant Puree Production

Sixty-seven and a half lbs. of fresh white delight sweet potatoes and 7.5 lbs. of frozen orange carrots were placed in a Fitzpatrick Comminutor at medium speed and a temperature of 145° F. to 180° F., 180° F. maximum. The puree was thereafter processed in the same manner outlined above concerning Sample PP5308. A total of 74.6 lbs. of puree were recovered. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product

Technical personnel sampled the aforementioned puree in the holding tank and determined that it had a total solids content of 23.88%. Personnel then make the following calculation: 13.6 lbs. is divided by 0.2388 (total solids content of puree), resulting in 56.95 lbs. of puree that needs to be added to the batch. Based on this calculation, personnel placed 56.95 lbs. of the aforementioned puree and 21.55 lbs. of batch water in a Koven Kettle that is capable of holding 300 lbs. of product. The puree was heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 7.9 lbs. of water were added to the batch via the steam injection. The product is transferred from the Koven Kettle to a stockpot and weighed. Additional water, if necessary, is added to bring the product weight to 100 lbs. In this case, 2.10 lbs. of water was added to the batch to achieve a total weight of 100 lbs. The product was thereafter processed in the same manner outlined above concerning Sample PP5308.

Pilot Plant Preparation of Sample PP5349

This version of Turkey-Rice Dinner used a formula containing a ratio of 80% fresh White Delight sweet potatoes and 20% frozen orange carrots. The vitamin A analysis was 150% of the Daily Value per serving.

Step One—Pilot Plant Puree Production

Sixty lbs. of fresh white sweet potatoes and 15 lbs. of frozen orange carrots were placed in a Fitzpatrick Comminutor at medium speed and a temperature of 145° F. to 180° F., 200° F. maximum. Approximately 2.0 lbs. of water were added through steam injection in the Comminutor, resulting in a total batch weight of 77 lbs. The puree was thereafter processed in the same manner outlined above concerning Sample PP5308.

Step Two—Pilot Plant Manufacturing Procedures for the Product

Technical personnel sampled the aforementioned puree in the holding tank and determined that it had a total solids content of 22.22%. Personnel then make the following calculation: 12.8 lbs. is divided by 0.2222 (total solids content of puree), resulting in 57.6 lbs. of puree that needs to be added to the batch. Based on this calculation, personnel placed 57.6 lbs. of the aforementioned puree and 20.9 lbs. of batch water in a Koven Kettle that is capable of holding 300 lbs. of product. The puree is heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 6.2 lbs. of water were added to the batch via the steam injection. The product is transferred from the Koven Kettle to a stockpot and weighed. Additional water, if necessary, is added to bring the product weight up to 100 lbs. In this case, 3.80 lbs. of water were added to the batch to achieve a total weight of 100 lbs. The product was thereafter processed in the same manner outlined above concerning Sample PP5308.

Pilot Plant Preparation of Sample PP5350

This version of Turkey-Rice Dinner used a formula containing a ratio of 70% fresh White Delight sweet potatoes and 30% frozen orange carrots. The vitamin A analysis was 224% of the Daily Value per serving.

Step One—Pilot Plant Puree Production

Fifty-two and a half lbs. of fresh white delight sweet potatoes and 22.5 lbs. of frozen orange carrots were placed in a Fitzpatrick Comminutor at medium speed and a temperature of 145° F. to 180° F., 180° F. maximum. A total of 74.30 lbs. of vegetable puree were recovered. The puree was thereafter processed in the same manner outlined above concerning Sample PP5308. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product

Technical personnel sampled the aforementioned puree in the holding tank and determined that it had a total solids content of 19.65%. Personnel then make the following calculation: 11.9 lbs. is divided by 0.1965 (total solids content of puree), resulting in 60.55 lbs. of puree that needs to be added to the batch. Based on this calculation, personnel placed 60.55 lbs. of the aforementioned puree and 17.95 lbs. of batch water in a Koven Kettle that is capable of holding 300 lbs. of product. The puree was heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 6.3 lbs. of water were added to the batch via the steam injection. The product is transferred from the Koven Kettle to a stockpot and weighed. Additional water, if necessary, is added to bring the product weight to 100 lbs. In this case, 3.70 lbs. of water was added to the batch to achieve a total weight of 100 lbs. The product was thereafter processed in the same manner outlined above concerning Sample PP5308.

Pilot Plant Preparation of Sample PP5382

This version of Turkey-Rice Dinner used a formula containing fresh white delight sweet potatoes. The vitamin A analysis was 27% of the Daily Value per serving.

Step One—Pilot Plant Puree Production

Seventy-five lbs. of fresh white sweet potatoes were placed in a Fitzpatrick Comminutor at medium speed and a temperature of 145° F. to 180° F., 180° F. maximum. Approximately 0.7 lbs. of water were added through steam injection in the Comminutor, resulting in a total batch weight of 75.7 lbs. The puree was thereafter processed in the same manner outlined above concerning Sample PP5308.

Step Two—Pilot Plant Manufacturing Procedures for the Product

Technical personnel sampled the aforementioned puree in the holding tank and determined that it had a total solids content of 23.33%. Personnel then make the following calculation: 14 lbs. is divided by 0.2333 (total solids content of puree), resulting in 60.00 lbs. of puree that needs to be added to the batch. Based on this calculation, personnel placed 60.00 lbs. of the aforementioned puree and 18.5 lbs. of batch water in a Koven Kettle that is capable of holding 300 lbs. of product. The puree was heated to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 7.3 lbs. of water were added to the batch via the steam injection. The product is transferred from the Koven Kettle to a stockpot and weighed. Additional water, if necessary, is added to bring the product weight to 100 lbs. In this case, 0.7 lbs. of water were added to the batch to achieve a total weight of 100 lbs. The product was thereafter processed in the same manner outlined above concerning Sample PP5308.

Commercial Production of Turkey-Rice Dinner with White Sweet Potatoes

A Turkey-Rice Dinner with White Sweet Potatoes may be produced on a commercial basis using a 100% white sweet potato formula as follows:

| Ingredients | Percentage by weight theoretical | Weight/Batch |
|---|---|---|
| white sweet potato puree, made from fresh white sweet potatoes | 62.83 | 1885 lbs. |
| turkey, raw, minced | 10.00 | 300 lbs. |
| rice, medium grain | 5.0 | 150 lbs. |
| batch water, estimated | 14.0 | 420 lbs. |
| water from steam injection, estimated | 8.17 | 245 lbs. |
|  | 100% | 3,000 lbs. |

The following two-step method may be used in commercial production of a 3,000 lbs. batch. First, a puree is prepared using fresh white sweet potatoes. In the second step, the puree is combined with other ingredients to produce the baby food in commercial quantities.

Step One—Commercial Puree Production

The sweet potatoes are cured by holding them at 85° F. and 85–90% relative humidity for 4–7 days. The sweet potatoes pass through a reel washer, destoner, scrubber and another destoner. The washed and scrubbed sweet potatoes pass through a steam peeler and a scrubber where brushes remove the skins which were loosened in the peeler. The sweet potatoes are scrubbed again and fed into a washer.

Thereafter the sweet potatoes pass through a rod washer for final washing. The sweet potatoes pass through a Robinson cutter equipped with a one-inch square screen for size reduction. The white sweet potatoes are placed in a Fitzpatrick Comminutor, Model No. F-20, at medium speed and a temperature of 145° F.–180° F., 180° F. maximum. Approximately 25 lbs. of water are added through steam injection for each 100 lbs. of fresh peeled sweet potatoes. The spinning knives in the Comminutor and the injected steam comminute the sweet potatoes into a puree that passes through a ½" square hole screen. The puree passes through a trap magnet and is then microcut using a Stephan Microcutter, Model No. 100 or 100 DII, equipped with two 0.9 mm/0.2 mm rings. The puree is pumped into a holding tank to await batching.

Step Two—Commercial Manufacturing Procedures for the Product

Carrots are available and are commonly utilized in fresh peeled as well as frozen form. Moreover, frozen carrots are available in variously sized pieces; smaller pieces carry more frozen water and thus can differ substantially in their proportions of total solids. For these reasons, the total solids of purees wholly or partially comprised of carrots is a critical determinant of finished product consistency. Consequently, the total solids measurement is used to determine batch composition.

In contrast, sweet potatoes can only be used in the fresh condition and must undergo controlled conversion of a portion of the starch to avoid starch separation. These two disadvantages of sweet potatoes have been described heretofore. However, since the nature of the sweet potato raw material and its conversion process are so tightly defined, a benefit accrues in that converted sweet potato puree is much less variable than a puree wholly or partially comprised of carrots. This lesser variability can be exploited in the production environment and both time and effort can be saved by metering a set weight of converted sweet potato puree.

One thousand eight hundred and eighty-five lbs. of puree and 420 lbs. of batch water are placed in a Koven Kettle, having a capacity of 3,000 lbs. of product. The other ingredients are then added in no particular order as follows: 300 lbs. of minced turkey and 150 lbs of medium grain rice. Using steam injection, all of the ingredients are cooked in a Koven Kettle at about 215° F.–220° F. for about 20 minutes. Approximately 245 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Turkey-Rice Dinner is then placed in glass jars and further processed in a conventional manner and as required by 21 C.F.R. §113.

Product so produced had a Beta-carotene content equivalent to 26% of the Daily Value of vitamin A per serving, and the following Hunterlab colormeter results: L=46.51; a=9.60; and b=28.39.

EXAMPLE 3

Five different samples of Macaroni & Beef Dinner were prepared at the pilot plant, and were assigned numbers PP5524, PP5525, PP5526, PP5527 and PP5528. These samples had the characteristics shown in Tables 9 and 10 below.

TABLE NO. 9

Macaroni & Beet Dinner

| Sample Number | Relative Proportions of Orange Carrots | Relative Proportions of White Carrots | Beta Carotene ppm | Beta Carotene Expressed As Vit. A % DV/serv. |
|---|---|---|---|---|
| PP5524 | 100% | 0% | 31.1 | 390% |
| PP5525 | 75% | 25% | 20.7 | 260% |
| PP5526 | 50% | 50% | 14.0 | 176% |
| PP5527 | 25% | 75% | 8.8 | 111% |
| PP5528 | 0% | 100% | 1.0 | 12% |

TABLE NO. 10

Macaroni & Beef Dinner Hunterlab Colormeter Results

| Sample | L | a | b |
|---|---|---|---|
| PP5524 | 49.37 | 19.66 | 31.19 |
| PP5525 | 49.2 | 18.72 | 30.54 |
| PP5526 | 49.93 | 17.63 | 30.17 |
| PP5527 | 47.36 | 16.33 | 27.45 |
| PP5528 | 48.96 | 16.44 | 25.81 |

Pilot Plant Preparation of Sample PP5524.

The pilot plant produced these samples on a batch basis, each batch weighing approximately 100 lbs. The pilot plant procedures are designed to mimic commercial scale production. However, the two procedures are not identical. Commercial production will also be done on a batch basis, each batch ordinarily weighing approximately 3,000 lbs. The procedures for commercial production will be discussed in greater detail below.

Pilot plant production of sample number 5524 for a Macaroni & Beef Dinner was accomplished using a two step procedure, i.e., first, a vegetable puree containing carrots and peas is prepared; second, the vegetable puree is combined with other ingredients to produce the Macaroni & Beef Dinner. Sample number 5524 used a formula with 100% orange carrots. The vitamin A analysis was 390% of the Daily Value per serving.

Step One—Pilot Plant Puree Production

Seventy-two lbs. of frozen orange carrots and 3 lbs. of frozen peas were placed in a Fitzpatrick Comminutor, Model No. D, at medium speed and a temperature of 195° F.–205° F. (200° F. target). Approximately 17.90 lbs. of water were added through steam injection, resulting in a total batch weight of 92.90 lbs. The spinning knives in the Comminutor and the injected steam comminute the frozen vegetables into a puree that passes through a 3/16" or ¼" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 5.8 lbs. of vegetable puree total solids to the batch.

Step Two—Pilot Plant Manufacturing Procedures for the Product

Technical personnel sampled the aforementioned puree in the holding tank and determined that it had a total solids content of 9.64%. Personnel then make the following calculation: 5.8 lbs. is divided by 0.0964 (total solids content of puree), resulting in 60.15 lbs. of vegetable puree that needs to be added to the batch. Based on this calculation, personnel placed 60.15 lbs. of the aforementioned vegetable and 10.85 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree (12% total solids in the tomato puree.) Using steam injection, all of the ingredients are cooked in the Koven Kettle at about 212° F. for 10 minutes. When temperatures exceed 210° F. in the kettle, pressure is developed because it is a sealed pressure vessel. About 2.5 lbs. of water were added to the batch via the steam injection. The product is transferred from the Koven Kettle to a stockpot and weighed. Additional water, if necessary, is added to bring the product weight to 100 lbs. In this case, 5.5 lbs. of water were added to the batch to achieve a total weight of 100 lbs.

The product is then microcut using a Stephan Microcutter, Model No. MC-12, equipped with a 0.75 mm ring; the product is microcut a second time using a 0.05–0.10 mm ring. The product is then strained twice through an orifice having a 0.05" opening. The Macaroni & Beef Dinner is then placed in glass jars and further processed in a conventional manner and as required by 21 C.F.R. §113.

Pilot Plant Preparation of Sample PP5525

This version of Macaroni & Beef Dinner used a formula containing 75% orange carrots and 25% white carrots. The vitamin A analysis was 260% of the Daily Value per serving.

Step One—Pilot Plant Puree Production

Fifty-four lbs. of frozen orange carrots, 18 lbs. of frozen white carrots, and 3 lbs. of frozen green beans were placed in a Fitzpatrick Comminutor, Model No. D, at medium speed and a temperature of 195° F.–205° F. (200° F. target). Approximately 15.3 lbs. of water were added through steam injection, resulting in a total batch weight of 90.3 lbs. The puree was thereafter processed in the same manner outlined above concerning Sample PP5524.

Step Two—Pilot Plant Manufacturing Procedures for the Product

Technical personnel sampled the aforementioned vegetable puree in the holding tank and determined that it had a total solids content of 9.84%. Personnel then make the following calculation: 5.8 lbs. is divided by 0.0984 (total solids content of puree), resulting in 58.95 lbs. of vegetable puree that needs to be added to the batch. Based on this calculation, personnel placed 58.95 lbs. of the aforementioned vegetable puree and 12.05 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 6.0 lbs. of water were added to the batch via the steam injection. The product is transferred from the Koven Kettle to a stockpot and weighed. Additional water, if necessary, is added to bring the product weight to 100 lbs. In this case, 2 lbs. of water were added to the batch to achieve a total weight of 100 lbs. The product was thereafter processed in the same manner outlined above concerning Sample PP5524.

Pilot Plant Preparation of Sample PP5526

This version of Macaroni & Beef Dinner used a formula containing 50% orange carrots and 50% white carrots. The vitamin A analysis was 176% of the Daily Value per serving.

Step One—Pilot Plant Puree Production

Thirty-six lbs. of frozen orange carrots, 36 lbs. of frozen white carrots, and 3 lbs. of frozen peas were placed in a Fitzpatrick Comminutor at medium speed and a temperature of 195° F.–205° F. (200° F. target). Approximately 14 lbs. of water were added through steam injection, resulting in a total batch weight of 89 lbs. The puree was thereafter processed in the same manner outlined above concerning Sample PP5524.

Step Two—Pilot Plant Manufacturing Procedures for the Product

Technical personnel sampled the aforementioned vegetable puree in the holding tank and determined that it had a total solids content of 10.07%. Personnel then make the following calculation: 5.8 lbs. is divided by 0.1007 (total solids content of puree), resulting in 57.60 lbs. of vegetable puree that needs to be added to the batch. Based on this calculation, personnel placed 57.60 lbs. of the aforementioned vegetable puree and 13.4 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 4.2 lbs. of water were added to the batch via the steam injection. The product is transferred from the Koven Kettle to a stockpot and weighed. Additional water, if necessary, is added to bring the product weight to 100 lbs. In this case, 3.8 lbs. of water were added to the batch to achieve a total weight of 100 lbs. The product was thereafter processed in the same manner outlined above concerning Sample PP5524.

Pilot Plant Preparation of Sample PP5527

This version of Macaroni & Beef Dinner used a formula containing 25% orange carrots and 75% white carrots. The vitamin A analysis was 111% of the Daily Value per serving.

Step One—Pilot Plant Puree Production

Eighteen lbs. of frozen orange carrots, 54 lbs. of frozen white carrots, and 3 lbs. of frozen peas were placed in a Fitzpatrick Comminutor at medium speed and a temperature of 195° F.–205° F. (200° F. target). Approximately 12.4 lbs. of water were added through steam injection, resulting in a total batch weight of 87.4 lbs. The puree was thereafter processed in the same manner outlined above concerning Sample PP5524.

Step Two—Pilot Plant Manufacturing Procedures for the Product

Technical personnel sampled the aforementioned vegetable puree in the holding tank and determined that it had a total solids content of 10.10%. Personnel then make the following calculation: 5.8 lbs. is divided by 0.1010 (total solids content of puree), resulting in 57.45 lbs. of vegetable puree that needs to be added to the batch. Based on this calculation, personnel placed 57.45 lbs. of the aforementioned vegetable puree and 13.55 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 7.6 lbs. of water were added to the batch via the steam injection. The product is transferred from the Koven Kettle to a stockpot and weighed. Additional water, if necessary, is added to bring the product weight to 100 lbs. In this case, 0.4 lbs. of water were added to the batch to achieve a total weight of 100 lbs. The product was thereafter processed in the same manner outlined above concerning Sample PP5524.

Pilot Plant Preparation of Sample PP5528

This version of Macaroni & Beef Dinner used a formula containing 100% white carrots. The vitamin A analysis was 12% of the Daily Value per serving.

Step One—Pilot Plant Puree Production

Seventy-two lbs. of frozen white carrots and 3 lbs. of frozen peas were placed in a Fitzpatrick Comminutor at medium speed and a temperature of 195° F.–205° F. (200° F. target). Approximately 10 lbs. of water were added through steam injection, resulting in a total batch weight of 85 lbs. The puree was thereafter processed in the same manner outlined above concerning Sample PP5524.

Step Two—Pilot Plant Manufacturing Procedures for the Product

Technical personnel sampled the aforementioned vegetable puree in the holding tank and determined that it had a total solids content of 9.51%. Personnel then make the following calculation: 5.8 lbs. is divided by 0.0951 (total solids content of puree), resulting in 61.0 lbs. of vegetable puree that needs to be added to the batch. Based on this calculation, personnel placed 61.0 lbs. of the aforementioned vegetable puree and 10.0 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 7.1 lbs. of water were added to the batch via the steam injection. The product is transferred from the Koven Kettle to a stockpot and weighed. Additional water, if necessary, is added to bring the product weight to 100 lbs. In this case, 0.9 lbs. of water were added to the batch to achieve a total weight of 100 lbs. The product was thereafter processed in the same manner outlined above concerning Sample PP5524.

Commercial Production of Macaroni & Beef Dinner

A Macaroni & Beef Dinner may be produced on a commercial basis using a 100% white carrot formula as follows:

| Ingredients | Percentage by weight theoretical | Weight/Batch |
| --- | --- | --- |
| carrots, frozen (adjusted to provide 12% total solids) | 45.0 | 1350 lbs. |
| beef, frozen | 8.0 | 240 lbs. |
| macaroni rings | 4.0 | 120 lbs. |
| tomato paste, 31% total solids | 3.48 | 104 lbs. |
| peas, frozen | 2.0 | 60 lbs. |
| batch water, estimated | 19.59 | 588 lbs. |
| water from steam injection, estimated | 17.93 | 538 lbs. |
|  | 100% | 3,000 lbs. |

Mixed vegetable puree may be substituted for frozen carrots and peas. If mixed vegetable puree is substituted for frozen carrots and frozen peas, the weight of mixed vegetable puree added to the batch is variable, depending on the total solids of the mixed vegetable puree.

The following two-step method will be used in commercial production of a 3,000 lbs. batch. First, a vegetable puree is prepared using frozen carrots and frozen peas. In the second step, the vegetable puree is combined with other ingredients to produce the baby food in commercial quantities.

Step One—Commercial Puree Production

Thirteen hundred and fifty lbs. of frozen white carrots and 60 lbs. of frozen peas are placed in a Fitzpatrick Comminutor, Model No. F-20, at medium speed and a temperature of 200° F.–210° F. (205° F. target). Approximately 280 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.50% is necessary, however, a target total solids of 9.00%–9.49% is desired.

Step Two—Commercial Manufacturing Procedures for the Product

The amount of puree used in commercial production and the amount of batch water varies based on the total solids content in the puree. The amount of vegetable puree and batch water is selected based on the adjustment table.

TABLE NO. 11

| VEGETABLE PUREE/BATCH WATER ADJUSTMENT TABLE | | |
| --- | --- | --- |
| Total Solids Vegetable Puree | Lbs. Vegetable Puree | Lbs. Batch Water |
| 7.50%–7.99% (Minimum) | 2171 | — |
| 8.00%–8.49% | 2045 | 126 |
| 8.50%–8.99% | 1924 | 247 |
| 9.00%–9.49% Target | 1817 | 354 |
| 9.50%–9.99% | 1722 | 449 |
| 10.00%–10.49% | 1636 | 535 |
| 10.50%–10.99% | 1558 | 613 |
| 11.00%–11.49% | 1487 | 684 |
| 11.50%–12.00% | 1422 | 749 |

Assuming a total solids content of 9.0%–9.49%, 1,817 lbs. of puree and 354 lbs. of batch water are placed in a Koven Kettle, having a capacity of 3,000 lbs. of product. The other ingredients are then added in no particular order as follows: 240 lbs. of frozen ground beef, 120 lbs. of macaroni rings and 104 lbs. of tomato paste. Using steam injection, all of the ingredients are cooked in a Koven Kettle at about 212° F. for about 10 minutes. Approximately 200 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Turkey-Rice Dinner is then placed in glass jars and further processed in a conventional manner and as required by 21 C.F.R. §113.

EXAMPLE 4

Five different samples of Vegetable-Beef Dinner were prepared at the pilot plant and were assigned numbers PP5518, PP5519, PP5520, PP5521 and PP5522. These samples had the characteristics shown in Tables 12 and 13 below.

TABLE NO. 12

Vegetable-Beef Dinner

| Sample Number | Relative Proportions of Orange Carrots | White Carrots | Beta Carotene ppm | Beta Carotene Expressed As Vit. A % DV/serv. |
|---|---|---|---|---|
| PP5518 | 100% | 0% | 27.4 | 344% |
| PP5519 | 75% | 25% | 18.9 | 237% |
| PP5520 | 50% | 50% | 9.4 | 118% |
| PP5521 | 25% | 75% | 4.5 | 56% |
| PP5522 | 0% | 100% | 0.1 | 2% |

TABLE NO. 13

Vegetable-Beef Dinner Hunterlab Colormeter Results

| Sample | L | a | b |
|---|---|---|---|
| PP5518 | 54.2 | 10.03 | 33.61 |
| PP5519 | 53.43 | 8.56 | 32.11 |
| PP5520 | 54.08 | 6.82 | 30.30 |
| PP5521 | 55.67 | 5.61 | 28.96 |
| PP5522 | 58.1 | 1.93 | 22.12 |

Pilot Plant Preparation of Sample PP5518

The pilot plant produced these samples on a batch basis, each batch weighing approximately 100 lbs. Pilot plant production of sample number 5518 for a Vegetable-Beef Dinner was accomplished using a two step procedure, i.e., first, a vegetable puree containing carrots and peas is prepared; second, the vegetable puree is combined with other ingredients to produce the Vegetable-Beef Dinner. Sample number 5518 used a formula with 100% orange carrots. The vitamin A analysis was 344% of the Daily Value per serving.

Step One—Pilot Plant Puree Production

Seventy lbs. of frozen orange carrots and 10 lbs. of frozen peas were placed in a Fitzpatrick Comminutor, Model No. D, at medium speed and a temperature of 195° F.–205° F. (200° F. target). Approximately 19.15 lbs. of water were added through steam injection, resulting in a total batch weight of 99.15 lbs. The spinning knives in the Comminutor and the injected steam comminute the frozen vegetables into a puree that passes through a 3/16" or 1/4" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 5.1 lbs. of vegetable puree total solids to the batch.

Step Two—Pilot Plant Manufacturing Procedure for the Product

Technical personnel sampled the aforementioned vegetable puree in the holding tank and determined that it had a total solids content of 10.75%. Personnel then make the following calculation: 5.1 lbs. is divided by 0.1075 (total solids content of puree), resulting in 47.45 lbs. of vegetable puree that needs to be added to the batch. Based on this calculation, personnel placed 47.45 lbs. of the aforementioned vegetable puree from the holding tank and 32.55 lbs. of batch water in a Koven Kettle that is capable of holding 300 lbs. of product. The other ingredients are then added in no particular order as follows: 8 lbs. of frozen ground beef and 4 lbs. of dehydrated 1/4" diced potatoes. Using steam injection, all of the ingredients are cooked in the Koven Kettle at about 212° F. for about 10 minutes. When temperatures exceed 210° F. in the kettle, pressure is developed because it is a sealed pressure vessel. About 7.0 lbs. of water was added to the batch via the steam injection. The product is transferred from the Koven Kettle to a stockpot and weighed. Additional water, if necessary, is added to bring the product weight to 100 lbs. In this case, one lb. of water was added to the batch to achieve a total weight of 100 lbs.

The product is first microcut using a Stephan Microcutter, Model No. MC-12, equipped with a 0.75 mm ring; the product is microcut a second time using a 0.5–0.10 mm ring. The product is then strained twice through an orifice having a 0.05" opening. The Vegetable-Beef Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5519

This version of Vegetable-Beef Dinner used a formula containing 75% orange carrots and 25% white carrots. The vitamin A analysis was 237% of the Daily Value per serving.

Step One—Pilot Plant Puree Production

Fifty-two and one half lbs. of frozen orange carrots, 17.5 lbs. of frozen white carrots, and 10 lbs. of frozen peas were placed in a Fitzpatrick Comminutor, Model No. D, at medium speed and a temperature of 195° F. to 205° F. (200° F. target). Approximately 16.4 lbs. of water were added through steam injection in the Comminutor, resulting in a total batch weight of 96.4 lbs. The puree was thereafter processed in the same manner outlined above concerning Sample PP5518.

Step Two—Pilot Plant Manufacturing Procedures for the Product

Technical personnel sampled the aforementioned vegetable puree in the holding tank and determined that it had a total solids content of 10.97%. Personnel then make the following calculation: 5.1 lbs. is divided by 0.1097 (total solids content of puree), resulting in 46.5 lbs. of vegetable puree that needs to be added to the batch. Based on this calculation, personnel placed 46.5 lbs. of the aforementioned vegetable puree and 33.5 lbs. of batch water in a Koven Kettle that is capable of holding 300 lbs. of product. The other ingredients are then added in no particular order as follows: 8 lbs. of frozen ground beef and 4 lbs. of dehydrated 1/4" diced potatoes. Using steam injection, all of the ingredients are cooked in the Koven Kettle at about 212° F. for 10 minutes. About 7.8 lbs. of water were added to the batch via the steam injection. The product is transferred from the Koven Kettle to a stockpot and weighed. Additional water, if necessary, is added to bring the product weight to 100 lbs. In this case, 0.2 lbs. of water were added to the batch to achieve a total weight of 100 lbs. The product was thereafter processed in the same manner outlined above concerning Sample PP5518.

Pilot Plant Preparation of Sample PP5520

This version of Vegetable-Beef Dinner used a formula containing 50% orange carrots and 50% white carrots. The vitamin A analysis was 118% of the Daily Value per serving.

Step One—Pilot Plant Puree Production

Thirty-five lbs. of frozen orange carrots, 35 lbs. of frozen white carrots, and 10 lbs. of frozen peas were placed in a Fitzpatrick Comminutor, Model No. D, at medium speed and a temperature of 195° F. to 205° F. (200° F. target). Approximately 16.5 lbs. of water were added through steam injection in the Comminutor, resulting in a total batch weight of 96.5 lbs. The puree was thereafter processed in the same manner outlined above concerning Sample PP5518.

Step Two—Pilot Plant Manufacturing Procedures for the Product

Technical personnel sampled the aforementioned vegetable puree in the holding tank and determined that it had a total solids content of 11.7%. Personnel then make the following calculation: 5.1 lbs. is divided by 0.117 (total solids content of puree), resulting in 43.6 lbs. of vegetable puree that needs to be added to the batch. Based on this calculation, personnel placed 43.6 lbs. of the aforementioned vegetable puree and 36.4 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the ingredients are cooked in the Koven Kettle at about 212° F. for 10 minutes. About 7.2 lbs. of water were added to the batch via the steam injection. The product is transferred from the Koven Kettle to a stockpot and weighed. Additional water, if necessary, is added to bring the product weight to 100 lbs. In this case, 0.8 lbs. of water were added to the batch to achieve a total weight of 100 lbs. The product was thereafter processed in the same manner outlined above concerning Sample PP5518.

Pilot Plant Production of Sample PP5521

This version of Vegetable-Beef Dinner used a formula containing 25% orange carrots and 75% white carrots. The vitamin A analysis was 56% of the Daily Value per serving.

Step One—Pilot Plant Puree Production

Seventeen and a half lbs. of frozen orange carrots, 52.5 lbs. of frozen white carrots and 10 lbs. of frozen peas were placed in a Fitzpatrick Comminutor, Model No. D, at medium speed and a temperature of 195° F. to 205° F. (200° F. target). Approximately 13.6 lbs. of water were added through steam injection, resulting in a total batch weight of 93.6 lbs. The puree was thereafter processed in the same manner outlined above concerning Sample PP5518.

Step Two—Pilot Plant Manufacturing Procedures for the Product

Technical personnel sampled the aforementioned vegetable puree in the holding tank and determined that it had a total solids content of 10.65%. Personnel then make the following calculation: 5.1 lbs. is divided by 0.1065 (total solids content of puree), resulting in 47.9 lbs. of vegetable puree that needs to be added to the batch. Based on this calculation, personnel placed 47.9 lbs. of the aforementioned vegetable puree and 32.1 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the aforementioned ingredients are cooked in the Koven Kettle at about 212° F. for about 10 minutes. About 6.7 lbs. of water are added to the batch via the steam injection. The product is transferred from the Koven Kettle to a stockpot and weighed. Additional water, if necessary, is added to bring the product weight to 100 lbs. In this case, 1.3 lbs. of water was added to the batch to achieve a total weight of 100 lbs. The product was thereafter processed in the same manner outlined above concerning Sample PP5518.

Pilot Plant Production of Sample PP5522

This version of Vegetable-Beef Dinner used a formula containing 100% white carrots. The vitamin A analysis was 2% of the Daily Value per serving.

Step One—Pilot Plant Puree Production

Seventy lbs. of frozen white carrots and 10 lbs. of frozen peas were placed in a Fitzpatrick Comminutor, Model No. D, at medium speed and a temperature of 195° F. to 205° F. (200° F. target). Due to losses of puree in the Comminutor and associated piping which could not be recovered without endangering employee safety, only 75.7 lbs. of puree were recovered. The puree was thereafter processed in the same manner outlined above concerning Sample PP5518.

Step Two—Pilot Plant Manufacturing Procedures for the Product

Technical personnel sampled the aforementioned vegetable puree in the holding tank and determined that it had a total solids content of 10.89%. Personnel then make the following calculation: 5.1 lbs. is divided by 0.1089 (total solids content of puree), resulting in 46.9 lbs. of vegetable puree that needs to be added to the batch. Based on this calculation, personnel placed 46.9 lbs. of the aforementioned vegetable puree and 33.10 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the aforementioned ingredients are cooked in the Koven Kettle at about 212° F. for about 10 minutes. About 9.1 lbs. of water were added to the batch via the steam injection. The product is transferred from the Koven Kettle to a stockpot and weighed. This batch weighed 101.1 lbs. and no more water was added. The product was thereafter processed in the same manner outlined above concerning Sample PP5518.

Commercial Production of Vegetable-Beef Dinner

A Vegetable-Beef Dinner may be produced on a commercial basis using a 100% white carrot formula as follows:

| Ingredients | Percentage by weight theoretical | Weight/Batch |
| --- | --- | --- |
| carrots, frozen (adjusted to provide 12% total solids) | 35.0 | 1050 lbs. |
| beef, frozen | 8.0 | 240 lbs. |
| peas | 5.0 | 150 lbs. |
| potatoes, dehydrated | 4.0 | 120 lbs. |
| batch water, estimated | 33.0 | 990 lbs. |
| water from steam injection, estimated | 15.0 | 450 lbs. |
| | 100% | 3,000 lbs. |

Carrot puree or peeled fresh carrot can be substituted in the above formula for frozen carrots. If carrot puree is substituted for frozen carrots, the weight of carrot puree added to the batch is variable, depending on the total solids of the carrot puree.

The following two-step method will be used in commercial production of a 3,000 lbs. batch. First, a vegetable puree is prepared using frozen carrots and frozen peas. In the second step, the vegetable puree is combined with other ingredients to produce the baby food in commercial quantities.

Step One—Commercial Puree Production

One thousand and fifty lbs. of frozen white carrots and 150 lbs. of frozen peas are placed in a Fitzpatrick Comminutor, Model No. F-20, at medium speed and a temperature of 200° F.–210° F. (205° F. target). Approximately 240 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 6.50% is necessary, however, a target total solids of 9.00%–9.49% is desired.

Step Two—Commercial Manufacturing Procedures for the Product

The amount of vegetable puree used in commercial production and the amount of batch water varies based on the total solids content in the vegetable puree. The amount of vegetable puree and batch water is selected based on the following adjustment table.

TABLE NO. 14

VEGETABLE PUREE/BATCH WATER ADJUSTMENT TABLE

| Total Solids Vegetable Puree | Lbs. Vegetable Puree | Lbs. Batch Water |
|---|---|---|
| 6.50%–6.99% (Minimum) | 2326 | 132 |
| 7.00%–7.49% | 2160 | 298 |
| 7.50%–7.99% | 2016 | 442 |
| 8.00%–8.49% | 1890 | 568 |
| 8.50%–8.99% | 1778 | 680 |
| 9.00%–9.49% Target | 1680 | 778 |
| 9.50%–9.99% | 1592 | 866 |
| 10.00%–10.49% | 1512 | 946 |
| 10.50%–10.99% | 1440 | 1018 |
| 11.00%–11.49% | 1375 | 1083 |
| 11.50%–12.00% | 1315 | 1143 |

Assuming a total solids content of 9.0%–9.49%, 1,680 lbs. of puree and 778 lbs. of batch water are placed in a Koven Kettle, having a capacity of 3,000 lbs. of product. The other ingredients are then added in no particular order as follows: 240 lbs. of frozen ground beef and 120 lbs of ¼" diced dehydrated potatoes. Using steam injection, all of the ingredients are cooked in a Koven Kettle at about 212° F. for about 10 minutes. Approximately 182 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Vegetable-Beef Dinner is then placed in glass jars and further processed in a conventional manner and as required by 21 C.F.R. §113.

EXAMPLE 5

Five different samples of Mixed Vegetables were prepared at the pilot plant and were assigned numbers PP5535, PP5536, PP5537, PP5538 and PP5539. These samples had the characteristics shown in Tables 15 and 16 below.

TABLE NO. 15

Mixed Vegetables

| Sample Number | Relative Proportions of Orange Carrots | Relative Proportions of White Carrots | Beta Carotene ppm | Beta Carotene Expressed As Vit. A % DV/serv. |
|---|---|---|---|---|
| PP5535 | 100% | 0% | 51.6 | 648% |
| PP5536 | 75% | 25% | 35.5 | 446% |
| PP5537 | 50% | 50% | 24.7 | 310% |
| PP5538 | 25% | 75% | 13.3 | 167% |
| PP5539 | 0% | 100% | 0.3 | 4% |

TABLE NO. 16

Mixed Vegetables Hunterlab Colormeter Results

| Sample | L | a | b |
|---|---|---|---|
| PP5535 | 54.2 | 15.92 | 24.43 |
| PP5536 | 53.43 | 13.82 | 24.22 |
| PP5537 | 54.08 | 10.64 | 22.90 |
| PP5538 | 55.67 | 6.68 | 22.73 |
| PP5539 | 58.1 | 1.04 | 19.99 |

Pilot Plant Preparation of Sample PP5535

The pilot plant produced these samples on a batch basis, each batch weighing approximately 100 lbs. Pilot plant production of sample number 5535 for Mixed Vegetables was accomplished using a two step procedure, i.e., first, a vegetable puree containing carrots and green beans is prepared; second, the vegetable puree is further processed to produce the Mixed Vegetables. Sample number 5535 used a formula with 100% orange carrots. The vitamin A analysis was 648% of the Daily Value per serving.

Step One—Pilot Plant Puree Production

One hundred and twenty lbs. of frozen orange carrots and 20 lbs. of frozen green beans were placed in a Fitzpatrick Comminutor, Model No. D, at medium speed and a temperature of 195° F.–205° F. (200° F. target). Approximately 32.8 lbs. of water were added through steam injection, resulting in a total batch weight of 172.8 lbs. The spinning knives in the Comminutor and the injected steam comminute the frozen vegetables into a puree that passes through a 3/16" or ¼" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 8.2 lbs. of vegetable puree total solids to the batch.

Step Two—Pilot Plant Manufacturing Procedure for the Product

Technical personnel sampled the aforementioned vegetable puree in the holding tank and determined that it had a total solids content of 8.85%. Personnel then make the following calculation: 8.2 lbs. is divided by 0.0885 (total solids content of puree), resulting in 92.65 lbs. of vegetable puree that needs to be added to the batch. Based on this calculation, personnel placed 92.65 lbs. of the aforementioned vegetable puree in a Koven Kettle that is capable of holding 300 lbs. of product. Five lbs. of frozen peas are then added. Using steam injection, all of the ingredients are cooked in the Koven Kettle at about 200° F. for about 10 minutes. About 3 lbs. of water are added to the batch via the steam injection. The product is transferred from the Koven Kettle to a stockpot and weighed. This batch weighed 100.6 lbs. and no additional water was added.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Mixed Vegetables are then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5536

This version of Mixed Vegetables used a formula containing 75% orange carrots and 25% white carrots. The vitamin A analysis was 446% of the Daily Value per serving.

Step One—Pilot Plant Puree Production

Ninety lbs. of frozen orange carrots, 30 lbs. of frozen white carrots, and 20 lbs. of frozen green beans were placed in a Fitzpatrick Comminutor, Model No. D, at medium speed and a temperature of 195° F. to 205° F. (200° F. target). Approximately 28.95 lbs. of water were added through steam injection in the Comminutor, resulting in a total batch weight of 168.95 lbs. The puree was thereafter processed in the same manner outlined above concerning Sample PP5535.

Step Two—Pilot Plant Manufacturing Procedures for the Product

Technical personnel sampled the aforementioned vegetable puree in the holding tank and determined that it had a total solids content of 9.24%. Personnel then make the following calculation: 8.2 lbs. is divided by 0.0924 (total solids content of puree), resulting in 88.75 lbs. of vegetable puree that needs to be added to the batch. Based on this calculation, personnel placed 88.75 lbs. of the aforementioned vegetable puree was placed in a Koven Kettle that is capable of holding 300 lbs. of product. Five lbs. of frozen peas are then added. Using steam injection, all of the ingredients are cooked in the Koven Kettle at about 200° F. for 10 minutes. About 1.45 lbs. of water were added to the batch via the steam injection. The product is transferred from the Koven Kettle to a stockpot and weighed. Additional water, if necessary, is added to bring the product weight to 100 lbs. In this case, 4.8 lbs. of water were added to the batch to achieve a total weight of 100 lbs. The product was thereafter processed in the same manner outlined above concerning Sample PP5535.

Pilot Plant Preparation of Sample PP5537

This version of Mixed Vegetables used a formula containing 50% orange carrots and 50% white carrots. The vitamin A analysis was 310% of the Daily Value per serving.

Step One—Pilot Plant Puree Production

Sixty lbs. of frozen orange carrots, 60 lbs. of frozen white carrots, and 20 lbs. of frozen green beans were placed in a Fitzpatrick Comminutor, Model No. D, at medium speed and a temperature of 195° F. to 205° F. (200° F. target). Approximately 28.55 lbs. of water were added through steam injection in the Comminutor, resulting in a total batch weight of 168.55 lbs. The puree was thereafter processed in the same manner outlined above concerning Sample PP5535.

Step Two—Pilot Plant Manufacturing Procedures for the Product

Technical personnel sampled the aforementioned vegetable puree in the holding tank and determined that it had a total solids content of 8.76%. Personnel then make the following calculation: 8.2 lbs. is divided by 0.0876 (total solids content of puree), resulting in 93.6 lbs. of vegetable puree that needs to be added to the batch. Based on this calculation, personnel placed 93.6 lbs. of the aforementioned vegetable puree in a Koven Kettle that is capable of holding 300 lbs. of product. Five lbs. of frozen peas are then added. Using steam injection, all of the ingredients are cooked in the Koven Kettle at about 200° F. for 10 minutes. About 0.2 lbs. of water were added to the batch via the steam injection. The product is transferred from the Koven Kettle to a stockpot and weighed. Additional water, if necessary, is added to bring the product weight to 100 lbs. In this case, 1.2 lbs. of water were added to the batch to achieve a total weight of 100 lbs. The product was thereafter processed in the same manner outlined above concerning Sample PP5535.

Pilot Plant Production of Sample PP5538

This version of Mixed Vegetables used a formula containing 25% orange carrots and 75% white carrots. The vitamin A analysis was 167% of the Daily Value per serving.

Step One—Pilot Plant Puree Production

Thirty lbs. of frozen orange carrots, 90 lbs. of frozen white carrots and 20 lbs. of frozen green beans were placed in a Fitzpatrick Comminutor, Model No. D, at medium speed and a temperature of 195° F. to 205° F. (200° F. target). Approximately 24.45 lbs. of water were added through steam injection, resulting in a total batch weight of 164.45 lbs. The puree was thereafter processed in the same manner outlined above concerning Sample PP5535.

Step Two—Pilot Plant Manufacturing Procedures for the Product

Technical personnel sampled the aforementioned vegetable puree in the holding tank and determined that it had a total solids content of 9.44%. Personnel then make the following calculation: 8.2 lbs. is divided by 0.0944 (total solids content of puree), resulting in 86.85 lbs. of vegetable puree that needs to be added to the batch. Based on this calculation, personnel placed 86.85 lbs. of the aforementioned vegetable puree and 0.15 lbs. of batch water in a Koven Kettle that is capable of holding 300 lbs. of product. Five lbs. of frozen peas are then added. Using steam injection, all of the aforementioned ingredients are cooked in the Koven Kettle at about 200° F. for about 10 minutes. About 0.2 lbs. of water are added to the batch via the steam injection. The product is transferred from the Koven Kettle to a stockpot and weighed. Additional water, if necessary, is added to bring the product weight to 100 lbs. In this case, 7.80 lbs. of water was added to the batch to achieve a total weight of 100 lbs. The product was thereafter processed in the same manner outlined above concerning Sample PP5535.

Pilot Plant Production of Sample PP5539

This version of Mixed Vegetables used a formula containing 100% white carrots. The vitamin A analysis was 4% of the Daily Value per serving.

Step One—Pilot Plant Puree Production

One hundred and twenty lbs. of frozen white carrots and 20 lbs. of frozen green beans were placed in a Fitzpatrick Comminutor, Model No. D, at medium speed and a temperature of 195° F. to 205° F. (200° F. target). Approximately 11.75 lbs. of water were added through steam injection, resulting in a total batch weight of 151.75 lbs. The puree was thereafter processed in the same manner outlined above concerning Sample PP5535.

Step Two—Pilot Plant Manufacturing Procedures for the Product

Technical personnel sampled the aforementioned vegetable puree in the holding tank and determined that it had a total solids content of 9.08%. Personnel then make the following calculation: 8.2 lbs. is divided by 0.0908 (total solids content of puree), resulting in 90.3 lbs. of vegetable puree that needs to be added to the batch. Based on this calculation, personnel placed 90.3 lbs. of the aforementioned vegetable puree in a Koven Kettle that is capable of holding 300 lbs. of product. Five lbs. of frozen peas are then added. Using steam injection, all of the aforementioned ingredients are cooked in the Koven Kettle at about 200° F. for about 10 minutes. About 0.5 lbs. of water were added to the batch via the steam injection. The product is transferred from the Koven Kettle to a stockpot and weighed. Additional water, if necessary, is added to bring the product weight to 100 lbs. In this case, 4.2 lbs. of water were added to the batch to achieve a total weight of 100 lbs. The product was thereafter processed in the same manner outlined above concerning Sample PP5535.

Commercial Production of Mixed Vegetables

Mixed Vegetables may be produced on a commercial basis using a 100% white carrot formula as follows:

| Ingredients | Percentage by weight theoretical | Weight/Batch |
| --- | --- | --- |
| carrots, frozen (adjusted to provide 12% total solids) | 60.0 | 1800 lbs. |
| green beans, frozen | 10.0 | 300 lbs. |
| peas, frozen | 5.0 | 150 lbs. |
| batch water, estimated | 5.5 | 165 lbs. |
| water from steam injection, estimated | 19.5 | 585 lbs. |
| | 100% | 3,000 lbs. |

Peeled fresh carrots having a 12% total solids content may be substituted in the above formula for frozen carrots. Carrot puree may be substituted for frozen carrots. If carrot puree is substituted for frozen carrots, the weight of carrot puree added to the batch is variable, depending on the total solids of the carrot puree.

The following two-step method will be used in commercial production of a 3,000 lbs. batch. First, a vegetable puree is prepared using frozen carrots, frozen green beans and frozen peas. In the second step, the vegetable puree is further processed to produce the baby food in commercial quantities.

Step One—Commercial Puree Production

Eighteen hundred lbs. of frozen white carrots, 300 lbs. of frozen green beans and 150 lbs. of frozen peas are placed in a Fitzpatrick Comminutor, Model No. F-20, at medium speed and a temperature of 200° F.–210° F. (205° F. target). Approximately 450 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 9.00% is necessary, however, a target total solids of 9.00%–9.49% is desired.

Step Two—Commercial Manufacturing Procedures for the Product

The amount of vegetable puree used in commercial production and the amount of batch water varies based on the total solids content in the vegetable puree. The amount of vegetable puree and batch water is selected based on the following adjustment table.

TABLE NO. 17

VEGETABLE PUREE/BATCH WATER ADJUSTMENT TABLE

| Total Solids Vegetable Puree | Lbs. Vegetable Puree | Lbs. Batch Water |
| --- | --- | --- |
| 9.00%–9.49% Target | 2865 | — |
| 9.50%–9.99% | 2795 | 70 |
| 10.00%–10.49% | 2655 | 210 |
| 10.50%–10.99% | 2529 | 336 |
| 11.00%–11.49% | 2414 | 451 |
| 11.50%–12.00% | 2309 | 556 |

Assuming a total solids content of 9.0%–9.49%, 2,865 lbs. of vegetable puree is placed in a Koven Kettle, having a capacity of 3,000 lbs. of product. Using steam injection, the puree is cooked in a Koven Kettle at about 212° F. for about 10 minutes. Approximately 135 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Mixed Vegetables are then placed in glass jars and further processed in a conventional manner and as required by 21 C.F.R. §113.

Baby foods are produced in different forms, depending on the age of the intended consumer. For example, Beech-Nut Stage 1 products are intended to be consumed by babies from about three months of age. Beech-Nut Stage 2 products are intended to be consumed by babies from above six months of age. Beech-Nut Stage 2 products are strained and will pass through a 0.050 inch orifice. The products heretofore described are all Stage 2 products. Beech-Nut Stage 3 Junior products are intended to be consumed by babies from about nine months of age. Junior products have chunky components that will pass through a ⅜ inch screen.

Applicant intends to use white carrots in varying percentages in several other Stage 2 products as follows:

| Product White | Percent Orange | Percent |
| --- | --- | --- |
| Beef Noodle | 25 | 75 |
| Chicken & Rice | 25 | 75 |
| Chicken Soup | 50 | 50 |
| Vegetable Chicken | 50 | 50 |
| Vegetable Ham | 50 | 50 |
| Turkey Dinner Supreme | 0 | 100 |

Applicant intends to use white carrots in varying percentages in several Stage 3 products as well.

The percentage of white carrots can be varied from 25% to 100% to achieve control of beta-carotene levels and color. Those familiar with carrot cultivation are aware that orange carrots grow more orange in color as they mature in the soil. It is therefore possible to harvest an orange carrot cultivar at an immature stage to reduce the beta-carotene level of the vegetable and/or the end product. It may also be possible to develop a carrot cultivar that does not fit in the categories known to applicant, i.e. orange, (75–150 ppm), yellow (<10 ppm) or white (<10 ppm). For example, it may be possible to develop a new carrot cultivar that has a beta-carotene level of 25 ppm. For purposes of claim interpretation, the term white carrot shall include: a) any carrot cultivar currently in existence that has a nominal beta-carotene content, i.e. white carrots and yellow carrots; b) any new carrot cultivar that may be developed in the future that has a beta-carotene level of less than 50 ppm and c) orange carrots that have been harvested prior to maturity such that they have an average beta-carotene content of less than 50 ppm.

EXAMPLE 6

Eight different samples of Chicken Soup were prepared in the pilot plant and assigned numbers TK928A-G and TK926. Sample TK928C contained no white root vegetable, Samples TK928B and TK928D-G contained Hamburg parsley root, Sample TK928A contained parsnips and Sample TK926 contained celeriac root crown.

Samples TK928C to G represented an experiment to determine the effect of varying portions of orange carrots to Hamburg parsley root on carotene, vitamin A activity and color of chicken soup.

Samples TK926, TL928A and TK928B constituted a comparative study of the effects of the three different white-fleshed root vegetables (respectively celeriac root crown, parsnips, and Hamburg parsley root) at a relative proportion of 12.5% orange carrots and 87.5% white root vegetable.

The samples were prepared as follows:
Preparation of Sample TK928C

Sample Number TK928C used a formula with a relative proportion of 100% orange carrots. The Vitamin A analysis was 571% of the Daily Value per serving.

Ninety-six grams of ground chicken meat, 480 grams of orange carrots and 576 grams of water were placed in a double boiler cooking pot and heated to 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers," which is incorporated herein by reference.
Preparation of Sample TK928D Sample Number TK928D used a formula with a relative proportion of 75% orange carrots and 25% parsley root. The Vitamin A analysis was 521% of the Daily Value per serving.

Ninety-six grams of ground chicken meat, 360 grams of orange carrots, 120 grams of peeled and chopped parsley roots and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers," which is incorporated herein by reference.
Preparation of Sample TK928E Sample Number TK928E used a formula with a relative proportion of 50% orange carrots and 50% parsley roots. The Vitamin A analysis was 427% of the Daily Value per serving.

Ninety-six grams of ground chicken meat, 240 grams of orange carrots, 240 grams of peeled and chopped parsley roots and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.
Preparation of Sample TK928F Sample Number TK928F used a formula with a relative proportion of 25% orange carrots and 75% parsley roots. The Vitamin A analysis was 118% of the Daily Value per serving.

Ninety-six grams of ground chicken meat, 120 grams of orange carrots, 360 grams of peeled and chopped parsley roots and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.
Preparation of Sample TK928G Sample Number TK928G used a formula with a relative proportion of 100% parsley roots. The Vitamin A analysis was 15% of the Daily Value per serving.

Ninety-six grams of ground chicken meat, 480 grams of peeled and chopped parsley roots and 576 grams of water were placed in a double boiler cooking pot and heated to 190° F. to 200° F., stirring occasionally. Medium grain rice, 48 grams, was added and the mixture cooked at 190° F to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.

Based on these and previous results, a relative proportion of 12.5% orange carrots and 87.5% white root vegetable was selected for further study.

Preparation of Sample TK928A

Sample Number TK928A used a formula with a relative proportion of 12.5% orange carrots and 87.5% parsnips. The Vitamin A analysis was 68% of the Daily Value per serving.

Ninety-six grams of ground chicken meat, 60 grams of orange carrots, 420 grams of parsnips and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.

Preparation of Sample TK928B

Sample Number TK928B used a formula with a relative proportion of 12.5% orange carrots and 87.5% parsley roots. The Vitamin A analysis was 74% of the Daily Value per serving.

Ninety-six grams of ground chicken meat, 60 grams of orange carrots, 420 grams of chopped parsley roots and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.

Preparation of Sample TK926

Sample Number TK926 used a formula with a relative proportion of 12.5% orange carrots and 87.5% celery root (celeriac). The Vitamin A analysis was 37% of the Daily Value per serving.

Ninety-six grams of ground chicken meat, 60 grams of orange carrots, 420 grams of chopped celery root and 576 grams of water were placed in a double boiler cooking pot and heated to 190° F. to 200° F., stirring occasionally. Medium grain rice, 48 grams, was added and the mixture cooked at 190° F. to 200° F. for an additional 20 minutes, stirring occasionally. The double boiler was removed from the heat and the contents scraped into a tared blended container. Additional water was added as necessary to replace any evaporation during cooking, so as to maintain a total content weight of 1200 grams. The mixture was blended until smooth and then placed in glass jars and further processed in a conventional fashion and as further required by 21 C.F.R. § 113 et seq. "Thermally Processed Low-Acid Foods Packaged in Hermetically Sealed Containers, which is incorporated herein by reference.

The samples had the characteristics shown in Table 1 below.

Chicken Soup

| Sample Number | Relative Proportions of Orange Carrots | Relative Proportions of Hamburg Parsley | Beta Carotene ppm | Beta Carotene Expressed As Vit. A % DV/serv. |
|---|---|---|---|---|
| TK928C | 100% | 0% | 45.5 | 571% |
| TK928D | 75% | 25% | 41.5 | 521% |
| TK928E | 50% | 50% | 34.0 | 427% |
| TK928F | 25% | 75% | 9.4 | 118% |
| TK928G | 0% | 100% | 1.2 | 15% |

The color of the baby food was measured on a Hunterlab Colormeter with the results as follows:

| Sample Number | L | a | b |
|---|---|---|---|
| TK928C | 50.42 | 11.37 | 30.85 |
| TK928D | 50.62 | 10.27 | 29.58 |
| TK928E | 51.47 | 8.56 | 29.05 |
| TK928F | 54.58 | 6.10 | 27.39 |
| TK928G | 54.57 | 3.77 | 19.26 |

The color of the baby food was measured on a Hunterlab Colormeter with the results as follows:

Chicken Soup
Light-Fleshed Vegetable Comparison

| Sample Number | Light-Fleshed Vegetable | Ratio of Orange Carrots to Light-Fleshed Vegetable is 12.5 to 87.5 | Beta Carotene ppm | Beta Carotene Expressed As Vit. A % DV/serv. |
|---|---|---|---|---|
| TK926 | Celeriac Root Crown | | 2.9 | 37% |
| TK928A | Parsnips | | 5.4 | 68% |
| TK928B | Hamburg parsley root | | 5.9 | 74% |

| Sample Number | L | a | b |
|---|---|---|---|
| TK926 | 53.76 | 4.69 | 19.15 |
| TK928A | 55.97 | 7.12 | 22.86 |
| TK928B | 53.49 | 5.82 | 23.32 |

EXAMPLE 7

Two experimental samples of baby food were made with light-fleshed vegetable root and no other food ingredient other than the cooking water required to create a consistency suitable for consumption by babies. Three commercial samples of orange carrot puree were used for comparison. The samples had the following characteristics.

| Sample Number | Root vegetable | Beta Carotene ppm | Beta-Carotene Expressed As Vitamin A % DV/serv. |
|---|---|---|---|
| 6305 | Orange carrots | 28.5 | 333 |
| 6403 | Orange carrots | 25.1 | 315 |
| 6617 | Orange carrots | 29.5 | 370 |

-continued

| | | | |
|---|---|---|---|
| TK945 | White carrots | 0.0* | 0 |
| TK947 | Hamburg parsley root | 0.0* | 0 |

Hunterlab Colormeter Results

| Sample Number | L | a | b |
|---|---|---|---|
| 6305 | 36.88 | 26.35 | 22.20 |
| 6403 | 37.49 | 27.09 | 22.39 |
| 6617 | 41.39 | 31.24 | 24.61 |
| TK945 | 40.33 | 4.85 | 16.07 |
| TK947 | 44.10 | 5.89 | 19.13 |

*less than the detection limit of the method

Commercial Orange Carrot Baby Food Puree

Samples of Beech-Nut State 1 Tender Sweet Carrots produced on Mar. 5, 1996 (Coded 6305), Apr. 3, 1996 (Coded 6403), and Jun. 16, 1996 (Coded 6617) represented three examples of a current commercial embodiment of a pureed baby food preparation made with orange carrots and no other food ingredient other than the cooking water required to create a consistency suitable for consumption by babies.

Preparation of Sample TK945

Sample Number TK945 was a baby food preparation made with white carrots. The sample contained less carotene than the lower limit of detection of the analytical method. Consequently the Vitamin A analysis was 0% of the Daily Value per serving.

White carrot roots were prepared by washing and peeling, and then were cut into dices. one thousand grams of prepared white carrot dices were cooked in a pressure cooker at 15 p.s.i.g. for ten to fifteen minutes. The cooked dices were then placed in a food blender and blended until smooth. The puree was then placed in glass jars and further processed in a conventional fashion and as further required by 21 C.F.R. §113 et seq. "Thermally Processed Low-Acid Foods Packaged in Hermetically Sealed Containers," which is incorporated herein by reference.

Preparation of Sample TK947

Sample Number TK947 was a baby food preparation made with Hamburg parsley root. The sample contained less carotene than the lower limit of detection of the analytical method. Consequently the Vitamin A analysis was 0% of the Daily Value per serving.

Hamburg parsley roots were prepared by washing and peeling, and then were cut into dices. One thousand grams of prepared Hamburg parsley root dices were cooked in a pressure cooker at 15 p.s.i.g. for ten to fifteen minutes. The cooked dices were then placed in a food blender and blended until smooth. The puree was then placed in glass jars and further processed in a conventional fashion and as further required by 21 C.F.R. §113 et seq. "Thermally Processed Low-Acid Foods Packaged in Hermetically Sealed Containers," which is incorporated herein by reference.

EXAMPLE 8

Turkey Rice Dinner, a strained baby food, can have the following recipe: water, 35%; root vegetable, 50%; chicken, 10%; and rice, 5%. I prepared two different samples of Turkey Rice Dinner in my home kitchen according to this recipe on a batch basis, with each batch weighing 400 grams. The samples were assigned the numbers 7125A and 7125B. These samples had the carotene contents shown in Table 18 below. Data from Example 2 in application Ser. No. 08/604, 616 now U.S. Pat. No. 5,723,166 are shown for comparison.

TABLE No. 18

Turkey Rice Dinner

| | Relative portions | | | Beta Carotene | |
|---|---|---|---|---|---|
| | Light-Fleshed | | Light-Fleshed | | Expressed |
| Sample Number | Root Vegetable | Orange Carrots | Root Vegetable | PPM | As Vit. A % DV/serv. |
| data from Example 2 | | | | | |
| PP5513 | white carrots | 100% | 0% | 38.8 | 488% |
| PP5514 | white carrots | 75% | 25% | 26.5 | 332% |
| PP5515 | white carrots | 50% | 50% | 17.7 | 222% |
| PP5516 | white carrots | 25% | 75% | 13.1 | 185% |
| PP5517 | white carrots | 0% | 100% | 0.2 | 2% |
| current Example 8 | | | | | |
| HK7125B | beet root | 25% | 75% | 5.6 | 70% |
| HK7125A | beet root | 0% | 100% | 0.0 | 0% |

Hunterlab Colormeter Results

| Sample Number | L | a | b |
|---|---|---|---|
| PP5513 | 53.60 | 11.23 | 31.37 |
| PP5514 | 52.83 | 9.76 | 29.86 |
| PP5515 | 54.16 | 8.16 | 28.58 |
| PP5516 | 53.91 | 7.42 | 26.08 |
| PP5517 | 52.87 | 5.50 | 19.18 |
| HK7125B | 53.77 | 7.34 | 27.75 |
| HK7125A | 51.23 | 1.73 | 16.44 |

Home Kitchen Preparation of Sample 7125A.

This version of Turkey Rice Dinner used a formula containing 100% non-bleeding beet roots as the root vegetable source. The Vitamin A analysis was 0% of the Daily Value per serving.

Home kitchen preparation of sample 7125A was accomplished using a two-step procedure. Fresh sugar beet roots were obtained from Spreckels Sugar Company, Woodland, Calif. The beets were washed, peeled, sliced into disks and blanched in boiling water. The blanched disks were cut into dices and frozen until use. The dices were then thawed in a steam environment and blended with water to form a puree containing 75% beets and 25% water.

Forty grams of ground turkey meat, 20 grams of short grain rice, 266.7 grams of non-bleeding beet puree and about 50 grams of water were placed in a double boiler cooking pot and heated to 190° F. The mixture was cooked at 190° F. to 200° F. for fifteen minutes, stirring occasionally. The double boiler was removed from the heat and additional water was added to yield a total batch weight of 400 grams. The mixture was returned to the heat and the added water was mixed into the batch. The batch was then transferred into a blender container and the mixture blended until smooth. The mixture was placed in glass jars and retorted in a home pressure cooker for 40 minutes to achieve sterility.

Home Kitchen Preparation of Sample 7125B

This version of Turkey Rice Dinner used a formula containing 75% non-bleeding beet roots and 25% orange carrots as the root vegetable source. The Vitamin A analysis was 70% of the Daily Value per serving.

Home kitchen preparation of sample 7125B used the beet puree prepared as described above.

Forty grams of ground turkey meat, 20 grams of short grain rice, 200 grams of non-bleeding beet puree, 50 grams of frozen orange carrots and about 60 grams of water were placed in a double boiler cooking pot and heated to 190° F. The mixture was cooked at 190° F. to 200° F. for fifteen minutes, stirring occasionally. The double boiler was removed from the heat and additional water was added to yield a total batch weight of 400 grams. The mixture was returned to the heat and the added water was mixed into the batch. The batch was then transferred into a blender container and the mixture blended until smooth. The mixture was placed in glass jars and retorted in a home pressure cooker for 40 minutes to achieve sterility.

EXAMPLE 9

Vegetable Beef Dinner, a strained baby food, can have the following recipe: water, 48%; root vegetable, 35%; beef, 8%; peas, 5% and dehydrated potatoes, 4%. I prepared a sample of Vegetable Beef Dinner in my home kitchen according to this recipe on a batch basis, with the batch weighing 500 grams. The sample was assigned the number 7118A. This sample had the carotene content shown in Table 19 below. Data from Example 4 in application Ser. No. 08/604,616, made according to the same recipe, are shown for comparison.

TABLE NO. 19

Vegetable Beef Dinner Relative Portions

| Sample Number | Light-fleshed Root Vegetable | Orange Carrots | Light-Fleshed White Root Vegetable | Beta-Carotene PPM | Expressed as Vit. A % DV/serv. |
| --- | --- | --- | --- | --- | --- |
| data from Example 4 | | | | | |
| PP5518 | white carrots | 100% | 0% | 27.4 | 344% |
| PP5519 | white carrots | 75% | 25% | 18.9 | 237% |
| PP5520 | white carrots | 50% | 50% | 9.4 | 118% |
| PP5521 | white carrots | 25% | 75% | 4.5 | 56% |
| PP5522 | white carrots | 0% | 100% | 0.1 | 2% |
| current Example 9 | | | | | |
| 7118A | beet root | 0% | 100% | 0.0 | 0% |

Hunterlab Colormeter Results

| Sample Number | L | a | b |
| --- | --- | --- | --- |
| PP5518 | 54.20 | 10.03 | 33.61 |
| PP5519 | 53.43 | 8.56 | 32.11 |
| PP5520 | 54.08 | 6.82 | 30.30 |
| PP5521 | 55.67 | 5.61 | 28.96 |
| PP5522 | 58.17 | 1.93 | 22.12 |
| HK7118A | 53.45 | 0.75 | 16.56 |

Home Kitchen Preparation of Sample 7118A

This version of Vegetable Beef Dinner used a formula containing 100% non-bleeding beet roots as the root vegetable source. The Vitamin A analysis was 0% of the Daily Value per serving.

Home kitchen preparation of sample 7118A used the beet puree prepared as described in Example 8 above.

Forty grams of ground beef, 25 grams of frozen peas, 20 grams of dehydrated potatoes, 233.4 grams of non-bleeding beet puree, and about 130 grams of water were placed in a double boiler cooking pot and heated to 180° F. The mixture was cooked at 180° F. to 200° F. for ten minutes, stirring occasionally. The double boiler was removed from the heat and the mixture was transferred into a tared blender container. Additional water was added to yield a total batch weight of 500 grams and the mixture was blended until smooth. The mixture was placed in glass jars and retorted in a home pressure cooker for 40 minutes to achieve sterility.

EXAMPLE 10

Strained Beets is a strained baby food made with water and beets. I prepared a sample of Strained Beets in my home kitchen. The sample was assigned the number 7118C. This sample contained 0.0 PPM carotene, equivalent to 0% of the Daily Value in a four-ounce serving.

Home Kitchen Preparation of Sample 7118C

This version of Strained Beets used a formula containing 100% non-bleeding beet roots as the root vegetable source.

Home kitchen preparation of sample 7118C used the beet puree prepared as described in Example 8 above.

Approximately 150 to 180 grams of non-bleeding beet puree were heated in a microwave oven. The heated puree was then placed in glass jars and retorted in a home pressure cooker for 40 minutes to achieve sterility.

EXAMPLE 11

Beets & Beef, a strained baby food, can have the following recipe: water, 22.5%; root vegetable, 67.5%; and beef, 10%. I prepared a sample of Beets & Beef in my home kitchen according to this recipe on a batch basis, with the batch weighing 300 grams. The sample was assigned the number 7116C. This sample contained no detectible beta-carotene.

Home Kitchen Preparation of Sample 7116C

This version of Beets & Beef used a formula containing 100% non-bleeding beet roots as the root vegetable source. The Vitamin A analysis was 0% of the Daily Value per serving.

Home kitchen preparation of sample 7116C used the beet puree prepared as described in Example 8 above.

Thirty grams of ground beef and 270 grams of non-bleeding beet puree, were placed in a double boiler cooking pot and heated to 180° F. The mixture was cooked at 180° F. to 200° F. for fifteen minutes, stirring occasionally. The double boiler was removed from the heat and additional water was added to replace that lost to evaporation during cooking, yielding a total batch weight of 300 grams. The mixture was transferred into a blender container and the mixture was blended until smooth. The blended mixture was placed in glass jars and retorted in a home pressure cooker for 40 minutes to achieve sterility.

In America, most baby foods are sold in a ready-to-eat form. However, commercial baby foods can also be made and sold in dehydrated ("instant") form. For purposes of this application, the carotene values are expressed on the ready-to-eat basis.

Having now fully described the invention, it will be apparent to one of the ordinary skill in the art that many changes and modification can be made thereto without departing from the spirit of the invention as set forth herein.

I claim:

1. A baby food comprising water, a food suitable for consumption by babies, and a filler, the filler being comminuted non-bleeding beet root, the food, the filler and the baby food being acceptable for use as a baby food suitable for consumption by babies.

2. A baby food as set forth in claim 1 wherein the baby food is free of orange carrots.

3. A baby food as set forth in claim 1 containing at most about 20 ppm by weight beta-carotene.

4. A baby food as set forth in claim 3 containing at most about 1 ppm by weight beta-carotene.

5. A baby food as set forth in claim 1 that is free of added flour.

6. A baby food as set forth in claim 5 that is free of starch other than that of the non-bleeding beet root.

7. A baby food as set forth in claim 1 wherein the baby food is able to pass through a 0.05 inch diameter orifice.

8. A baby food as set forth in claim 1 wherein the baby food is free of added flour and added starch other than that present in comminuted whole foods in the baby food.

9. A method for preparation of a baby food, comprising mixing together water, at least one food suitable for consumption by babies and non-bleeding beet root filler to form a mixture, and further treating the mixture, if necessary, to produce a baby food suitable for consumption by babies.

10. A method as set forth in claim 9, wherein the water is mixed with at least two foods suitable for consumption by babies and the non-bleeding beet root.

11. A method as set forth in claim 10 wherein each of the at least two foods and the non-bleeding beet root is, or is treated to be, of suitable particulate sizes and texture for a baby food acceptable for consumption by babies.

12. A method as set forth in claim 9, further comprising cooking the at least one food and the non-bleeding beet root prior to formation of the mixture.

13. A method as set forth in claim 9, further comprising comminuting the at least one food and the non-bleeding beet root prior to formation of the mixture.

14. A method as set forth in claim 9, further comprising comminuting the at least one food and the non-bleeding beet root sufficiently prior to formation of the mixture such that the resulting baby food is able to pass through a 0.05 inch diameter orifice.

15. A method as set forth in claim 9 wherein the mixture is further treated by cooking the mixture.

16. A method as set forth in claim 9 wherein the mixture is further treated by comminuting the mixture.

17. A method as set forth in claim 9 wherein the mixture is further treated by comminuting the mixture sufficiently that the resulting baby food is able to pass through a 0.05 inch diameter orifice.

18. A method as set forth in claim 9 wherein the mixture is further treated by cooking and comminuting the mixture.

19. A method as set forth in claim 9 wherein the mixture is further treated by cooking and comminuting the mixture so that the resulting baby food is able to pass through a 0.05 inch diameter orifice.

20. A method for preparation of a low beta-carotene level baby food, comprising:
    (a) mixing together water, at least one pureed food and pureed non-bleeding beet root to form a food mixture;
    (b) cooking the food mixture to form a cooked food mixture; and
    (c) comminuting and straining the cooked food mixture to produce a reduced beta-carotene level baby food containing the pureed non-bleeding beet root as a filler and suitable for consumption by babies.

21. A method as set forth in claim 20 wherein the baby food produced is able to pass through a 0.05 inch diameter orifice and contains at most about 20 ppm by weight beta-carotene.

22. A method, for preparation of a low beta-carotene level baby food, comprising:
    (a) mixing together water, at least one food and non-bleeding beet root to form a food mixture;
    (b) pureeing and cooking the food mixture to form a cooked food mixture; and
    (c) comminuting and straining the cooked food mixture to produce a reduced beta-carotene level baby food wherein the non-bleeding but root is a filler and the baby food is suitable for consumption by babies.

23. A method for preparation of a baby food of a desired level of beta-carotene, comprising mixing together water, orange carrots, non-bleeding beet root filler, and at least one other food suitable for consumption by babies, wherein the orange carrots and the non-bleeding beet root are mixed in a relative weight ratio selected so that the baby food prepared by the method contains the desired level of beta-carotene, and the orange carrots, non-bleeding beet root and at least one other food are treated, if necessary, to produce a baby food suitable for consumption by babies.

24. A method as set forth in claim 23 wherein the desired level of beta-carotene is at most about 20 ppm by weight.

25. A method for preparation of a baby food, comprising mixing together water, a food suitable for consumption by babies and non-bleeding beet root to form a mixture, and further treating the mixture, if necessary, to produce a baby food suitable for consumption by babies wherein the non-bleeding beet root is a filler.

26. A baby food as set forth in claim 1 wherein the food imparts to the baby food a taste, color and texture, and the presence of the filler in the baby food does not significantly interfere with the taste, color and texture.

* * * * *